United States Patent
Modrow et al.

(10) Patent No.: US 11,655,155 B2
(45) Date of Patent: May 23, 2023

(54) METHOD FOR PRODUCING ACTIVATED CARBON AND ACTIVATED CARBON OBTAINED IN THIS WAY AND USE THEREOF

(71) Applicant: Blücher GmbH, Erkrath (DE)

(72) Inventors: Antje Modrow, Erkrath (DE); Bertram Böhringer, Erkrath (DE); Jann-Michael Giebelhausen, Erkrath (DE)

(73) Assignee: BLÜCHER GMBH

( * ) Notice: Subject to any disclaimer, the term of this patent is extended or adjusted under 35 U.S.C. 154(b) by 69 days.

(21) Appl. No.: 16/061,187

(22) PCT Filed: Aug. 24, 2016

(86) PCT No.: PCT/EP2016/069946
§ 371 (c)(1),
(2) Date: Jun. 11, 2018

(87) PCT Pub. No.: WO2017/097447
PCT Pub. Date: Jun. 15, 2017

(65) Prior Publication Data
US 2019/0177170 A1   Jun. 13, 2019

(30) Foreign Application Priority Data

Dec. 10, 2015 (DE) .......................... 102015015860.0
Jan. 25, 2016 (DE) .......................... 102015101215.7

(51) Int. Cl.
*C01B 32/336* (2017.01)
*B01J 20/20* (2006.01)
(Continued)

(52) U.S. Cl.
CPC .............. *C01B 32/336* (2017.08); *A62D 5/00* (2013.01); *B01J 20/20* (2013.01);
(Continued)

(58) Field of Classification Search
None
See application file for complete search history.

(56) References Cited

U.S. PATENT DOCUMENTS

| 4,839,331 A | 6/1989 | Maroldo et al. |
| 2002/0028333 A1* | 3/2002 | Giebelhausen .... B01J 20/28019 428/402 |

(Continued)

FOREIGN PATENT DOCUMENTS

| DE | 4304026 | 9/1993 |
| DE | 202009010612 | 10/2009 |

(Continued)

OTHER PUBLICATIONS

Fichtner et al.; Polymer-Based Spherical Activated Carbons—From Adsorptive Properties to Filter Performance; Chemie Ingenieur Technik; 83, No. 1-2, 53-60; 2011.*

(Continued)

*Primary Examiner* — Guinever S Gregorio
(74) *Attorney, Agent, or Firm* — Edward E. Sowers; Brannon Sowers & Cracraft PC

(57) ABSTRACT

The invention relates to a method for the production of activated carbon, in particular particulate activated carbon, having an increased mesopore and/or macropore volume fraction, preferably having an increased mesopore volume fraction.

15 Claims, 2 Drawing Sheets

(51) Int. Cl.
    *B01J 20/28* (2006.01)
    *C01B 32/366* (2017.01)
    *C01B 32/39* (2017.01)
    *A62D 5/00* (2006.01)

(52) U.S. Cl.
    CPC ... *B01J 20/28064* (2013.01); *B01J 20/28066* (2013.01); *B01J 20/28073* (2013.01); *B01J 20/28076* (2013.01); *B01J 20/28083* (2013.01); *B01J 20/28085* (2013.01); *C01B 32/366* (2017.08); *C01B 32/39* (2017.08); *C01P 2006/14* (2013.01); *C01P 2006/16* (2013.01); *Y02C 20/40* (2020.08)

(56) References Cited

U.S. PATENT DOCUMENTS

| | | | |
|---|---|---|---|
| 2011/0223494 A1* | 9/2011 | Feaver | H01M 4/8615 |
| | | | 429/405 |
| 2012/0172216 A1* | 7/2012 | Bohringer | B01J 20/28057 |
| | | | 502/416 |
| 2016/0296911 A1* | 10/2016 | Bohringer | B01J 20/20 |

FOREIGN PATENT DOCUMENTS

| | | |
|---|---|---|
| DE | 202014103530 | 7/2015 |
| DE | 102014107489 | 10/2015 |
| EP | 1801072 | 6/2007 |
| EP | 1918022 | 5/2008 |
| GB | 1525420 | 9/1978 |
| WO | 9928234 | 6/1999 |
| WO | 0183368 | 11/2001 |
| WO | 2005016819 | 2/2005 |
| WO | 2014183927 | 11/2014 |

OTHER PUBLICATIONS

Hasegawa G et al: "Fabrication of activated carbons with well-defined macropores derived from sulfonated poly (divinylbenzene) networks", Carbon, Elsevier, Oxford, GB, Bd. 48, Nr. 6, 1. May 2010, Seiten 1757-1766, XP026926482, ISS N: 0008-6223, DOI: 10.1016/J.CARBON.2010.01.019.

* cited by examiner

METHOD FOR PRODUCING ACTIVATED CARBON AND ACTIVATED CARBON OBTAINED IN THIS WAY AND USE THEREOF

CROSS-REFERENCES TO RELATED APPLICATIONS

This application is a National Stage filing of International Application PCT/EP 2016/069946, filed Aug. 24, 2016, claiming priority to DE 10 2015 015 860.0 filed Dec. 10, 2015, and to DE 10 2016 101 215.7 filed Jan. 25, 2016, entitled "Method for Producing Activated Carbon and Activated Carbon Obtained in this Way and Use Thereof". The subject application claims priority to PCT/EP 2016/069946, to DE 10 2015 015 860.0, and to DE 10 2016 101 215.7, and incorporates all by reference herein, in their entirety.

BACKGROUND OF THE INVENTION

The present invention relates to the technical field of adsorption materials and more particularly to the production of activated carbon.

The present invention especially relates to a method for producing activated carbon, especially particulate activated carbon, with increased mesopore and/or macropore volume fraction, preferably with increased mesopore volume fraction.

The present invention, furthermore, also relates to an activated carbon, especially particulate activated carbon, obtainable according to the method of the invention, and to an activated carbon as such, with the activated carbon according to the invention having an increased mesopore and/or macropore volume fraction, preferably an increased mesopore volume fraction.

The present invention relates, moreover, to a production plant for producing activated carbon, especially particulate activated carbon, with increased mesopore and/or macropore volume fraction, especially with increased mesopore volume fraction, or for implementing the method of the invention.

The present invention also relates to the uses of the activated carbon according to the invention.

Furthermore, the present invention relates to protective equipment and protective articles of any kind which are produced using the activated carbon according to the invention and/or which comprise the activated carbon of the invention.

Lastly, the present invention also relates to filters and filter materials of any kind which are produced using the activated carbon according to the invention and/or which comprise the activated carbon of the invention.

Activated carbon typically has a high carbon content or consists at least substantially of carbon, with activated carbon generally featuring a porous structure with a large internal surface area. The pores of the activated carbon here are interconnected, and so activated carbon especially is an open-pore system wherein the carbon serves, so to speak, as scaffold or matrix material for the formation of the pore system with the correspondingly high internal surface area. Its porosity gives activated carbon as such adsorptive properties which in general are decidedly nonspecific, and so activated carbon is employed as an adsorbent in numerous technical sectors, such as in the sectors of chemistry, medicine, water and wastewater treatment, ventilation technology, and also in the sector of protection from nuclear, biological and/or chemical poisons or noxiants, such as warfare agents.

Activated carbon is therefore distinguished by the presence of a specific pore system having an underlying pore size distribution (i.e., the respective fraction of micropores, mesopores, and macropores within the overall pore volume), this system being critical to the adsorptive properties, and the pores which form the pore system are generally subdivided or classified according to their size. Hence the pore size and the pore size distribution are subdivided into three orders of magnitude: micropores, which generally have a diameter of less than 2 nm; mesopores, which generally have a diameter of from 2 nm (inclusive) to 50 nm (inclusive); and, finally, macropores, with a pore diameter of more than 50 nm. In this regard, reference may also be made to observations hereinafter.

In particular, an increasing awareness of environmental responsibility, and also statutory impositions, are also leading to a rising demand for activated carbon and especially for activated carbon having comprehensively improved and/or tailored adsorption properties. Overall in the prior art, therefore, there is a high demand for provision of activated carbon-based adsorption materials which, based in particular on the targeted setting of the pore size distribution, have specific adsorption properties and/or high adsorption capacities in conjunction with high mechanical robustness and stability, particularly in respect of specific technical fields of use for the activated carbons provided. These requirements, however, are not always fully satisfied by prior-art activated carbon systems, one reason for this lack of satisfaction being the prior-art production methods for adsorption materials based on activated carbon, since these methods do not always end in the desired outcomes.

Accordingly, activated carbon can be produced in general from vegetable, animal, mineral or petrochemical sources, with examples of starting materials that can be used including wood, peat, nut shells, lignite or bituminous coal, or various plastics. Activated carbon is generally obtained by carbonization (also referred to synonymously as low-temperature carbonization, pyrolysis, roasting, or the like) and subsequent activation of the carbonaceous starting compounds or reactants (starting materials), the preference being for starting compounds which lead to economically viable yields. This is because the losses in weight and in material as a result in particular of detachment of volatile constituents during the carbonization and as a result of the subsequent burn-out during activation are in some cases appreciable, this being a disadvantage not least for reasons of process economy. For further details of the production of activated carbon, reference may be made for example to H. v. Kienle and E. Bäder, "*Aktivkohle and ihre industrielle Anwendung*", Enke Verlag Stuttgart, 1980.

Carbonization generally involves the conversion of the carbonaceous starting material into carbon—that is, in other words, the starting material is charred, so to speak. The nature of the activated carbon produced—such as finely or coarsely porous, firm or brittle, etc.—is critically dependent on factors including the starting material employed.

The basic principle of the post-carbonization activation (also referred to synonymously as pyrolysis or the like) is that of selectively and targetedly breaking down and/or burning out, under suitable conditions, a portion of the carbon that is generated in the carbonization. It results in numerous pores, cracks, and fissures, with an increase in the surface area per unit mass. On activation, then, a targeted burn-out of the previously carbonized material is performed.

Since carbon is broken down (particularly by oxidative processes) during activation, this procedure is accompanied by a certain loss of substance, which under ideal conditions equates to the aforementioned rise in the porosity and to an increase in the internal surface area and hence in the pore volume. Activation is accomplished in general under selective and/or controlled—in general, oxidizing—conditions.

Activated carbon is used in a variety of forms, such as carbon powder, splint coal or granulocarbon, molded carbon, and, since the end of the 1970s, activated carbon in spherical form ("spherocarbon"). Spherical activated carbon has a number of advantages over other forms of activated carbon, making it valuable or even indispensable for certain applications: spherical activated carbon is free-flowing, relatively abrasion-resistant, and in that context also relatively hard. Its properties endow it with a great deal of interest for particular fields of use.

Activated carbon, particularly in spherical form, is currently still mostly produced by multistage processes which in some cases are costly and inconvenient; one known process involves the production of spherules from bituminous coal tar pitch and suitable asphaltic residues from the petrochemicals industry. This procedure sees the starting material being oxidized—to render it unmeltable—and subsequently carbonized and activated. Activated carbon, particularly in spherical form, may also be produced, for example, in a multistage process starting from bitumen; these multistage processes are very cost-intensive, and the associated high price of the resulting activated carbon is a bar to its deployment in the numerous utilities.

In this context, WO 98/07655 A1 describes a process for producing activated carbon in spherical form wherein a mixture comprising a distillation residue from diisocyanate production, a carbonaceous processing aid, and optionally one or more further adjuvants is first processed into flowable spherules, after which the spherules thus obtained are carbonized and then activated.

The prior art further discloses the production of activated carbon in spherical form through carbonization and subsequent activation of virgin or unspent, or else spent, ion exchangers containing sulfonic acid groups among others, or by carbonization of ion exchanger precursors in the presence of sulfuric acid, with subsequent activation, wherein the sulfonic acid groups and the sulfuric acid, respectively, have the function of a crosslinker. Processes of this type are described for example in DE 43 28 219 A1 and in DE 43 04 026 A1 and also in DE 196 00 237 A1 including the DE 196 25 069 A1 application for a German patent of addition.

There are specific applications, in particular, where importance is attached not only to the geometry or shaping of the activated carbon: instead, great significance also attaches to the porosity, especially to the total pore volume and also the pore size distribution, particularly in respect of the development of specific adsorption properties and/or high adsorption capacities. The macropores in particular here are responsible not only for the adsorptive properties but also for a critical function in the provision of access pathways for gases or liquids into the interior of the activated carbon, subsequently allowing the adsorption of the substances taken up into the pore system beforehand.

In this context, there are a series of applications where particular importance is assigned to a high meso- and macroporosity, especially a high mesoporosity, on the part of the activated carbon (i.e., a large mesopore and macropore volume fraction, especially a large mesopore volume fraction, relative to the total pore volume), this being the case, for example, in the context of the use of activated carbon for producing particular adsorption filter materials, e.g., for protective apparel in relation to nuclear, chemical and/or biological poisons or noxiants (NBC protection), for the adsorption of poisons, noxiants, and odors, particularly from gas or air streams, for the purification or reprocessing of gases, such as especially air, and also of liquids, for the sectors of medicine and pharmacy, for the sorptive storage of gases or liquids, and the like.

Activated carbons for this purpose are indeed known in principle in the prior art, with the activated carbons in question also possessing a certain meso- and/or macroporosity which, however, is not sufficient for every case or every application. In particular, the concrete fraction of mesopores and/or macropores within the total pore volume, and the absolute pore volume, of the activated carbons provided in the prior art are not always sufficient to ensure adsorption properties that satisfy all of the applications.

Moreover, the development of a defined porosity is sometimes associated with a marked decrease in the mechanical stability or in the abrasion resistance of the activated carbon, this being likewise undesirable.

In particular, the methods which are known in the prior art for producing activated carbon with defined porosity or with a defined pore size distribution are occasionally costly and inconvenient, particularly in that a multiplicity of methodological parameters have to be specifically stipulated and laboriously tailored to one another in order for any influence to be able to be exerted at all over the porosity of the activated carbon obtained. In some cases this is also accompanied by costly and inconvenient apparatus for implementing the methods. The prior-art methods, moreover, do not always end up with the desired porosities, especially pore size distributions, in the activated carbon provided, and they also often result in activated carbons whose mechanical stability and/or robustness is low.

BRIEF SUMMARY OF THE INVENTION

Against this background, then, the object of the present invention is that of providing a method for producing activated carbon with defined porosity, or a relevant activated carbon as such, in which the above-outlined disadvantages of the prior art are at least largely avoided or else at least diminished. In particular, the method provided in accordance with the invention is to lead to an activated carbon having defined porosity or pore size distribution, in particular with an increased mesopore and/or macropore volume fraction (i.e., with a high meso- and/or macroporosity), especially with increased mesopore volume fraction (i.e., with high mesoporosity), relative to the total pore volume of the activated carbon. The method provided in accordance with the invention is also, moreover, to result in corresponding activated carbons having high mechanical stability and robustness, particularly with regard to the attritional hardness and/or the compressive strength (bursting pressure per sphere) of the underlying activated carbon.

A further object of the present invention is to be seen as that of providing a corresponding method for producing a mesoporous and/or macroporous, especially mesoporous, activated carbon, this method being optimized in terms of its regime and/or course and including in particular an improvement in the management of the materials used for activated carbon production, in order on this basis as well to provide a cost-efficient and highly performing production method.

Yet a further object of the present invention is to be seen, moreover, in the provision of a corresponding activated carbon as such with which likewise the disadvantages attending the prior-art activated carbons are at least largely avoided or else at least diminished. The intention in particular is to provide an activated carbon which possesses a defined mesoand/or macroporosity, preferably a high mesoporosity, with the activated carbon at the same time exhibiting outstanding mechanical properties, particularly with regard to the stability of the activated carbon.

A still further object of the present invention is to be seen, moreover, in the provision of a corresponding production plant which allows the efficient implementation of the method provided in accordance with the invention, to give the activated carbon according to the invention, and which represents an improvement in its performance capacity over the production plants of the prior art.

To achieve the object outlined above, the present invention thus proposes—according to a first aspect of the present invention—a method for producing activated carbon, especially particulate activated carbon, with increased mesopore and/or macropore volume fraction, preferably with increased mesopore volume fraction, as described herein; advantageous developments and embodiments of this aspect of the invention are further described.

Additionally, the present invention—according to a second aspect of the present invention—relates to an activated carbon, especially particulate activated carbon, with increased mesopore and/or macropore volume fraction, preferably with increased mesopore volume fraction, as defined below; further embodiments, especially advantageous embodiments, of the activated carbon of the invention are provided.

Furthermore, the present invention—according to a third aspect of the present invention—also relates to a production plant for producing the activated carbon according to the invention, and, respectively, for implementing the method of the invention, this plant being as defined herein; further embodiments, especially advantageous embodiments, of the production plant of the invention are similarly defined.

Furthermore, the present invention—according to a fourth aspect of the present invention—also relates to the uses of the activated carbon according to the invention.

The present invention further relates—according to a fifth aspect of the present invention—to protective equipment and protective articles of any kind which are produced using the activated carbon according to the invention and/or which comprise the activated carbon of the invention as such.

Lastly, the present invention—according to a sixth aspect of the present invention—also relates to filters and filter materials which are produced using the activated carbon according to the invention and/or which comprise the activated carbon according to the invention.

It will be readily understood that in the description below of the present invention, those embodiments, forms of implementation, advantages, examples or the like which are recited below—for purposes of avoiding unnecessary repetition—in relation only to a single aspect of the invention do of course also apply mutatis mutandis in relation to the other aspects of the invention, without the need for any express mention.

It is additionally self-evident that where values, numbers, and ranges are stated below, the relevant value, number, and range recitations should not be understood as imposing any limitation; for the skilled person, it will be understood that in a particular case or particular application, departures from the recited ranges and particulars are possible without the realm of the present invention having been left.

It is the case, moreover, that all value details or parameter details stated hereinafter, or the like, may fundamentally be ascertained or determined using standard or standardized or explicitly recited methods of determination or else otherwise by the methods of determination or measurement that are familiar per se to the person skilled in this field. Unless indicated otherwise, the relevant values or parameters are ascertained under standard conditions (i.e., more particularly, at a temperature of 20° C. and/or under a pressure of 1013.25 hPa or 1.01325 bar).

It is the case, furthermore, that for all relative or percentage quantity figures recited below, especially those based on weight, these particulars can be selected and/or combined by the skilled person in the context of the present invention in such a way that the total—where appropriate with incorporation of further components or ingredients, particularly as defined hereinafter—is always 100% or 100 wt %. This, however, is self-evident to the skilled person.

This having been established, the present invention is described in more detail hereinafter.

DETAILED DESCRIPTION OF THE INVENTION

Figure 1:
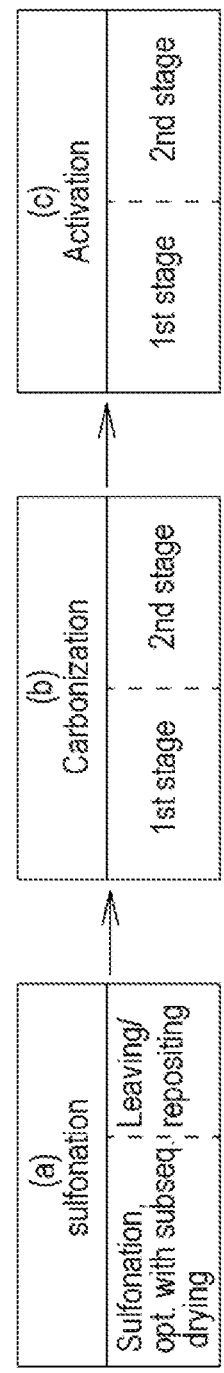
FIG. 1 shows a diagrammatic depiction of a method sequence of the invention, whereby in step (a) provision is made for sulfonation of a starting material, optionally with accompanying drying of the starting material, and also subsequent leaving and/or repositing of the sulfonated starting material, the starting material being subjected to defined volume expansion on the basis of the procedure of the method of the invention; subsequently, according to step (b) of the method of the invention, the sulfonated starting material obtained beforehand is carbonized, provision being made for a two-stage carbonization in this respect; next comes step (c), with the activation of the carbonized material obtained before on the basis of the sulfonated and volume-expanded starting material, the activation being based on a two-stage procedure.

A subject of the present invention—according to a first aspect of the present invention—is therefore a method for producing activated carbon, especially particulate activated carbon, with increased mesopore and/or macropore volume fraction, preferably with increased mesopore volume fraction, wherein the method comprises the following steps:

(a) sulfonating a polymeric organic starting material, especially a particulate polymeric organic starting material, by contacting the starting material with at least one sulfonating agent and subsequently causing to act and reacting the sulfonating agent with the starting material in such a way, especially for durations and/or at temperatures, that the sulfonation takes place with simultaneous volume expansion (volume increase) of the starting material; subsequently (b) carbonizing the sulfonated starting material (sulfonate) obtained in step (a); then (c) activating the carbonized starting material (carbonized material) obtained in step (b), especially to give the activated carbon (activated material).

The applicant, indeed, has found, completely surprisingly, that the method regime of the invention, whereby, specifically, a very specific sulfonation takes place with an associated volume expansion on the part of the polymeric organic starting material employed inventively, in combination with the further inventive measures of the subsequent carbonization and activation, results in very specific activated carbons which are present in particular in particulate form or in spherical form and which possess a defined porosity, especially a defined pore size distribution, to the effect that an activated carbon with increased mesopore and/or macropore volume fraction, and in particular with increased mesopore volume fraction, and therefore a mesoporous activated carbon, is provided.

A central idea of the present invention is considered to be that in step (a) of the method of the invention, within the sulfonation, the sulfonating agent is caused to act and reacted with the starting material after, or downstream of, the contacting of the starting material with the sulfonating agent, to the effect that in the case of the starting material, which is used in particular in particle form, there is a sulfonation-induced increase in the particle volume and hence an expansion in volume, or swelling, of the starting material.

On this basis, then, within the subsequent carbonization and/or activation of the starting material thus sulfonated, an activated carbon having the aforesaid specific porosity is obtained, which with an increased mesopore and/or macropore volume fraction, or with an increased mesopore volume fraction, at the same time has outstanding mechanical properties, in particular a high mechanical stability, such as high abrasion resistance or attritional hardness, and a high compressive strength or a high bursting pressure.

On the basis of the methodological regime according to the present invention, therefore, an activated carbon is presently provided that unites the diametral properties of a high and/or defined porosity, on the one hand, and a high mechanical stability, on the other, in one and the same material.

Indeed, without wishing to be limited to this theory, the directed causing to act and reacting of the sulfonating agent with the starting material, with the associated expansion in volume, already results in a change to the pore structure inherent in the starting material, to the effect that, so to speak, there is a widening or enlargement of the pores for the subsequent formation of mesoporous and/or macroporous structures in the activated carbon obtained, so that the porosity inherent in the activated carbon, within the approach according to the invention, is, so to speak, already generated or mandated in situ in the starting material as such.

Here, within the very specific sulfonation as carried out in accordance with the invention, again without wishing to be limited to this theory, strongly acidic groups in particular, preferably sulfonic acid groups, are generated homogeneously and in high concentration in the starting material, and this, within the subsequent carbonization and/or activation, leads to effective crosslinking and therefore to the development of defined carbon structures in the resultant activated carbon. The result on this basis, again without wishing to be limited to this theory, in addition to the defined porosity, is a high mechanical stability on the part of the activated carbon of the invention, this stability being manifested especially in a high abrasion resistance and also in a high compressive strength or a high bursting pressure. Moreover, the specific insertion of the functional groups contributes to the volume expansion of the starting material.

Within the approach of the invention, it is possible, by virtue of the specific selection of the methodological conditions present in the sulfonation, and also of the starter material, in agreement with the further steps of the method of the invention, to set the porosity in a targeted way, more particularly the pore size distribution, in relation to the attainable product in the form of the activated carbon, hence making it possible in accordance with the invention to provide activated carbons which are, so to speak, custom-tailored.

The activated carbons provided in accordance with the invention, as recited above, have a defined meso- and/or macroporosity, especially a high fraction of mesopores, based on the total pore volume of the activated carbon. As is set out in detail below, it is equally possible within the present invention to set a very narrow pore size distribution, thus allowing custom-tailored activated carbons having specific adsorption properties to be provided on that basis as well.

In accordance with the invention, therefore, it is equally possible, from one and the same starting material in the form of the polymeric organic starting material, to provide a multiplicity of end products having individually set and/or mandated porosity.

The method of the invention, moreover, is optimized in terms of the regime and the handling of the materials and apparatus used, to the effect that the specific properties of the resultant activated carbon, particularly with regard to the development of a specific porosity and also a high mechanical stability, can be stipulated as early as in step (a), with the contacting, envisaged therein, of the starting material with the sulfonating agent, and with the subsequent causing to act and reacting—in agreement with the subsequent carbonization and activation.

As recited further below, it is possible in a preferred way, within the present invention, for the material obtained in step (a) to be subjected to subsequent repositing (storage) and/or to subsequent leaving, a process which—as the applicant has likewise found, entirely surprisingly—goes hand in hand, in particular, with further (secondary) sulfonation and/or with (subsequent) volume expansion of the starting material, so that as a result it is possible to stipulate or set the corresponding properties of the resultant activated carbon in a further way. As a result of the optional leaving or repositing, moreover, it is possible to carry out targeted stockpiling of the sulfonated starting material or sulfonate, which then, so to speak, can be supplied on call or on demand, so to speak, to the subsequent carbonization and activation, thereby allowing the quantities employed in accordance with the invention, within the method, to be operated flexibly. This goes hand in hand with a further optimization, since the starting material even in the sulfonated form is not subject to premature aging or exhaustion. Another advantage associated with the present invention is that in contrast to the resulting end product in the form of the activated carbon, the sulfonated starting material is not subject to any inertization or premature exhaustion through contamination, and so there is no need for expensive and costly preservational storage, in an inert atmosphere or in an inert enclosure (welded in), for example, as is generally envisaged for activated carbon, for the sulfonated starting material.

The method of the invention, as also set out below, has the further feature that step (a) can be carried out separately or in separation from the subsequent steps. In this context, therefore, the production plant used for the method of the invention can be configured in an optimum way in terms of the respective apparatus for the sulfonation, on the one hand, and the carbonization and activation, on the other. In particular, through the physical and/or temporal separation of the method steps, the sulfonation as such can be performed in an optimum way, and can be aligned or adapted in relation to the starting material used and also to the desired product properties. Furthermore, the physical and/or temporal separation in particular of step (a) allows the sulfonated starting material to be reposited and/or left, as provided for optionally in accordance with the invention.

The term "polymeric organic starting material, especially particulate polymeric starting material" as used in accordance with the invention should be understood broadly within the present invention. In particular, the term in question refers to carbonaceous starting materials which within the methodological regime of the invention can be sulfonated and subsequently carbonized. The organic starting material may in particular have aromatic groups. Moreover, the starting material used in accordance with the invention may be in particulate or granular form, preferably in cone form. The starting material especially is a starting material having a pore system, or a porous starting material, with the starting material in question being able in particular to have a high fraction of micropores, based on the total pore volume. The inventively employable starting material comprises in particular the materials defined in detail below.

Furthermore, the term "sulfonation" as used inventively should be understood broadly. In particular, the term in question refers to the introduction of chemical groups, especially strongly acidic chemical groups, preferably sulfonic acid groups, which in particular are bound covalently to the molecular structure of the starting material.

Furthermore, the term "volume expansion" or "volume increase", also referred to synonymously as "swelling", as used within the present invention in connection with the sulfonation of the starting material and/or in relation to the leaving or repositing of the starting material subsequent to sulfonation, refers to an especially chemical, physicochemical corporeal enlargement in the particles underlying the starting material, as a result of an enlargement in the volume of the starting material used, with the volume increase able to be brought about as a consequence of an increase in mass (particularly through the incorporation and/or the generation of chemical groups, especially in the form of sulfonic acid groups) and/or as a consequence of an enlargement in the (average) molecular spacing within the starting material (as a result, for example, of physical swelling consequent on the incorporation of sulfonating agent, water, or the like). In general the volume expansion or volume increase takes place in all spatial directions and is therefore, so to speak, three-dimensional. In particular, the volume expansion is also accompanied by a widening or enlargement of the internal pore system of the starting material. In other words, the volume expansion or volume increase constitutes the difference, in particular the proportion or the mathematical difference, in the particle sizes of the starting material before and after the sulfonation has been carried out. In other words, the relative volume expansion or volume increase comes about from the proportion of volume (particle size) of the expanded sulfonated starting material (obtained in step (a) of the method) to volume (particle size) of the starting material (used at the start of step (a) of the method as raw material); the specified percentage values below for the volume expansion are then obtained from this proportion by multiplying this figure, determined as a relative volume proportion, by 100.

Within the present invention, moreover, the term "micropores" refers to those pores having pore diameters of less than 2 nm, whereas the term "mesopores" refers to those pores having pore diameters in the range from 2 nm (i.e., 2 nm inclusive) up to 50 nm inclusive, and the term "macropores" refers to those pores having pore diameters of more than 50 nm (i.e., >50 nm).

In this context, the term "mesopore and/or macropore volume fraction" refers in particular to the corresponding fraction of mesopores and/or macropores, respectively, among the total pore volume of the inventively provided activated carbon. Correspondingly, the term "mesopore volume fraction" refers to the fraction of mesopores in relation to the total pore volume of the activated carbon. Accordingly, an increased mesopore and/or macropore volume fraction means an increased meso- and/or macroporosity, and an increased mesopore volume fraction refers to an increased mesoporosity, on the part of the underlying activated carbon.

As far as the inventive method in general is concerned, the sulfonation carried out inventively in step (a) is carried out in summary against the background of generating chemical groups in a targeted way, in the form of, in particular, strongly acidic chemical groups and/or functional groups, especially sulfonic acid groups, in the starting material, together with the aforesaid volume expansion of the starting material. Within the further processing of the sulfonated starting material to give the activated carbon according to the invention, a thermal decomposition of the previously generated sulfonic acid groups and the formation of free radicals takes place in particular in step (b), and this in step (b), with the carbonization carried out therein, leads to instances of chemical crosslinking and hence to the formation of a corresponding (carbon) framework of the activated carbon obtained. In the subsequent step (c), activation then takes place with a further development and/or modification of the pore system of the resultant activated carbon.

Step (a) of the inventive method, with the sulfonation of the starting material, is further described below:

Thus it may be provided in step (a) that the sulfonating, especially the causing to act and reacting of the sulfonating agent with the starting material, is carried out for a duration in the range from 0.5 h to 24 h, especially from 0.5 h to 20 h, preferably in the range from 0.5 h to 20 h, more preferably in the range from 0.5 h to 16 h, very preferably in the range from 0.75 h to 14 h, especially preferably in the range from 1 h to 12 h, even more preferably in the range from 1.5 h to 10 h, most preferably in the range from 2 h to 8 h. Through the concrete selection or stipulation of the duration for the causing to act and reacting, it is possible to set or stipulate the degree of sulfonation and also the volume expansion of the starting material. In this context, the behavior in accordance with the invention is especially such that longer durations of the causing to act and reacting lead to a higher degree of sulfonation (i.e., to a higher number of sulfonic acid groups per unit mass of the starting material) and/or to a higher volume expansion or a larger volume increase of the starting material. In this regard, the skilled person is capable at any time of selecting or adapting the corresponding methodological conditions in particular in relation to the desired outcome. In particular, the applicant has found, entirely surprisingly, that longer durations of the causing to act and/or reacting lead to a further increase in the fraction of mesopores, based on the total pore volume, and hence to an increased mesoporosity of the product subsequently obtained in the form of the inventive activated carbon.

In accordance with the invention, provision is made in particular that in step (a) the sulfonating, especially the causing to act and reacting of the sulfonating agent with the starting material, is carried out at temperatures below the decomposition temperature of the sulfonating agent and/or at temperatures below the boiling point temperature of the sulfonating agent.

In this context it has proven advantageous, for effective sulfonation of the starting material, if in step (a) the sulfonating, especially the causing to act and reacting of the sulfonating agent with the starting material, is carried out at temperatures below the boiling or decomposition temperature of the sulfonating agent or at temperatures in the range from 25° C. to 330° C., especially in the range from 50° C. to 330° C., preferably in the range from 75° C. to 330° C., more preferably in the range from 90° C. to 320° C., very preferably in the range from 95° C. to 310° C., especially preferably in the range from 100° C. to 300° C. In this way it is possible to avoid premature chemical decomposition or chemical breakdown and hence to avoid premature removal of the sulfonating agent from the reaction medium, in conjunction with efficient generation of sulfonic acid groups.

According to a first embodiment of the present invention, moreover, provision may be made that in step (a) the sulfonation, especially the causing to act and reacting of the sulfonating agent with the starting material, is carried out at constant temperature.

According to an alternative embodiment of the present invention, conversely, provision may also be made that in step (a) the sulfonating, especially the causing to act and reacting of the sulfonating agent with the starting material, is carried out with application of a temperature gradient or a temperature profile. In this context provision may be made in particular that the temperature gradient or the temperature profile is formed time-dependently, especially by means of consecutive heating(-up) steps in the sulfonation apparatus envisaged for the sulfonating. In principle it is also possible to carry out spatial formation of the temperature gradient or profile, in the form, for example, of consecutive temperature zones in the sulfonation apparatus. Provision in that case may especially be made that the temperature increases in the processing or method direction, or downstream.

In accordance with the invention, provision may be made in this context that for the formation of the temperature gradient or the temperature profile, a temperature increase by at least 50° C., especially by at least 75° C., preferably by at least 100° C., more preferably by at least 125° C., more preferably by at least 150° C., is carried out.

Equally, the temperature of the temperature gradient or temperature profile may lie or be varied in the range from 90° C. to 330° C., especially in the range from 100° C. to 300° C., preferably in the range from 120° C. to 250° C. The temperature of the temperature gradient or the temperature profile may be set especially in a period of 5 min to 120 min, especially 10 min to 90 min, preferably 15 min to 60 min.

In relation to the methodological regime of the invention, provision may be made in step (a) that the temperature gradient or the temperature profile is set and/or carried out continuously, especially linearly. For example, the temperature may time-dependently and/or on a downstream basis be increased or maintained or reduced, especially increased.

According to a further inventive embodiment, provision may also be made that in step (a) the temperature gradient or the temperature profile is set or carried out stagewise, especially with application or formation of at least one temperature plateau (hold temperature, temperature stage). For setting the temperature plateau in this case, the temperature may be raised, lowered or maintained time-dependently and/or on a downstream basis, especially raised or maintained. Through the formation of defined temperature plateaus it is possible for the underlying sulfonation to be further controlled or set. The respective temperature plateaus here may be set or carried out consecutively in terms of time and/or space (in processing direction).

In this context, it has proven advantageous if the stage of the temperature gradient or the temperature profile, especially the temperature plateau, lies in the range from 90° C. to 330° C., especially in the range from 100° C. to 330° C.

In this context, moreover, the procedure adopted may be such that the stage of the temperature gradient of the temperature profile, especially the temperature plateau, is set or maintained for a duration in the range from 0.1 h to 20 h, especially in the range from 0.2 h to 16 h, preferably in the range from 0.3 h to 12 h, more preferably in the range from 0.5 h to 10 h.

In particular, at least one first stage of the temperature gradient or the temperature profile, especially a first temperature plateau, may be set or carried out, and this may be done in particular with a temperature in the range from 100° C. to 200° C. Thereafter (i.e., thereafter temporally and/or thereafter spatially (i.e., in processing direction or downstream)), moreover, at least one second stage of the temperature gradient or the temperature profile, especially a second temperature plateau, may be set or carried out, especially with a temperature in the range from 200° C. to 330° C. The reason is that within the present invention it has emerged as being particularly advantageous, for the sulfonation and the formation of a specific porosity in relation to the product in the form of the activated carbon, if the sulfonation is carried out on the basis of two temperature plateaus and/or two hold temperatures, as defined above. In this context it is possible especially to realize the times and durations indicated in general above for the temperature gradients or temperature profiles, especially temperature plateaus.

Depending on the selected temperature, and/or in particular at the end of step (a), there may also in particular be drying of the sulfonated starting material, for example, in the context of the second temperature plateau recited above. In this regard, reference may also be made to observations hereinafter.

Within the sulfonation carried out in step (a), the strongly acidic chemical and/or functional groups, especially those leading subsequently to instances of crosslinking, especially sulfonic acid groups, are generated so to speak in-situ.

As far as the sulfonating agent used within step (a) of the inventive method is concerned, it may comprise, according to one inventively preferred embodiment, sulfur trioxide ($SO_3$), especially in the form of oleum and/or preferably concentrated sulfuric acid, preferably in the form of a mixture of oleum and preferably concentrated sulfuric acid.

The sulfonating agent here is used especially in liquid form, especially in the form of an aqueous solution and/or using water as solvent.

As far as the sulfuric acid, especially concentrated sulfuric acid, is concerned, it may comprise at least 50%, preferably at least 60%, more preferably at least 70%, very preferably at least 80%, especially preferably at least 90%, even more preferably at least 95% strength sulfuric acid (amount or mass of sulfuric acid per mass of solvent, especially water; e.g., 95% strength sulfuric acid=950 g of sulfuric acid to 1000 g of solvent, especially water).

The amount of sulfonating agent used may vary within wide ranges. In accordance with the invention, however, particularly good results are achieved if in step (a) the sulfonating agent, especially sulfur trioxide ($SO_3$), preferably in the form of oleum and/or preferably concentrated sulfuric acid, is used in an amount in the range from 10 wt % to 95 wt %, especially in the range from 20 wt % to 90 wt %, preferably in the range from 30 wt % to 85 wt %, more preferably in the range from 40 wt % to 80 wt %, very preferably in the range from 50 wt % to 80 wt %, based on the total weight of the resulting composition (mixture) of sulfonating agent and starting material.

In particular, in step (a), the sulfonating agent may be used in the form of oleum in an amount in the range from 5 wt % to 85 wt %, especially in the range from 10 wt % to 80 wt %, preferably in the range from 20 wt % to 75 wt %, more preferably in the range from 30 wt % to 70 wt %, based on the total weight of the resulting composition (mixture) of sulfonating agent and starting material. The inventively employed oleum, also referred to synonymously as fuming sulfuric acid, comprises in particular a solution of sulfur trioxide in sulfuric acid beyond the stoichiometric ratio. This is known as such to the skilled person.

Equally, in step (a), the sulfonating agent may be used in the form of preferably concentrated sulfuric acid in an amount in the range from 5 wt % to 80 wt %, especially in the range from 5 wt % to 75 wt %, preferably in the range from 10 wt % to 70 wt %, more preferably in the range from 15 wt % to 65 wt %, based on the total weight of the resulting composition (mixture) of sulfonating agent and starting material.

Besides the quantity figures given above, great importance is also attached to the ratio of the sulfonating agents employed optionally in combination:

Hence provision may be made in accordance with the invention that in step (a) the sulfonating agent may be used in the form of oleum, on the one hand, and preferably concentrated sulfuric acid, on the other hand, is used in a weight ratio (oleum:sulfuric acid) in the range from 5:1 to 1:3, especially in the range from 4:1 to 1:2, preferably in the range from 4:1 to 1:1, more preferably in the range from 3:1 to 1:1, very preferably 2.5:1 to 1.5:1. Moreover, within the present invention, provision may be made that in step (a) the sulfonating agent, especially sulfur trioxide ($SO_3$), preferably in the form of oleum and/or preferably concentrated sulfuric acid, on the one hand, and the starting material, on the other hand, are used in step (a) in a weight ratio (sulfonating agent starting material) in the range from 5:1 to 1:3, especially in the range from 4:1 to 1:2, preferably in the range from 4:1 to 1:1, more preferably in the range from 3:1 to 1:1, very preferably 2.5:1 to 1.5:1.

In particular, provision may also be made that in step (a) the sulfonating agent in the form of oleum, on the one hand, and the starting material, on the other hand, are used in a weight ratio (oleum:starting material) in the range from 5:1 to 1:4, especially in the range from 3:1 to 1:3, preferably in the range from 2:1 to 1:2, more preferably in the range from 1.5:1 to 1:1.

Furthermore, in step (a), the sulfonating agent in the form of preferably concentrated sulfuric acid, on the one hand, and the starting material, on the other hand, may be used in a weight ratio (sulfuric acid:starting material) in the range from 6:1 to 1:3, especially in the range from 5:1 to 1:2, preferably in the range from 4:1 to 1:1, more preferably in the range from 3:1 to 1:1.

Generally, in step (a), the sulfonating agent, in the form of oleum and preferably concentrated sulfuric acid, on the one hand, and the starting material, on the other hand, may be used in a weight ratio (oleum:sulfuric acid:starting material) in the range from (1 to 6):(1 to 4):(1 to 10), especially in the range from (1 to 5):(1 to 3):(1 to 6).

Furthermore, in step (a), the sulfonating agent may be contacted with the starting material preferably in such a way that there is at least substantially complete wetting of the starting material with the sulfonating agent. For example, the starting material may be incorporated into the sulfonating agent, especially by immersion. The sulfonating agent may be introduced in a customary manner into the sulfonation apparatus and contacted with the starting material, by being sprayed in or jetted in or the like, for example. The contacting may also be accomplished by stirring, using a stirring mechanism or stirring device, for example.

In accordance with the invention, provision may be made that the procedure in step (a) is operated discontinuously or continuously, especially discontinuously (batchwise), or that step (a) is carried out discontinuously or continuously, especially discontinuously. In particular, step (a) of the method of the invention may be carried out in a discontinuously or continuously, especially discontinuously, operating sulfonation and/or reaction apparatus, especially in a rotary tube, preferably rotary tube furnace, or in a stirring reactor.

The sulfonation and/or reaction apparatus on which the sulfonation is based is more particularly a corresponding apparatus made from a material with a high acid resistance, in order to prevent corrosive wear. The relevant materials are well-known as such to the skilled person, and so there is no need for any further observations in this regard.

In accordance with the invention, provision may further be made that in particular in step (a) the sulfonated starting material is dried. In this operation, in particular, any excess liquid or, in particular, aqueous fraction of the sulfonating agent may be removed. The drying may for example be part of the causing to act and reacting of the sulfonating agent with the starting material. The drying may be carried out especially at the end or in the end phase of the causing to act and reacting of the sulfonating agent with the starting material in step (a). The drying may especially be carried out in the same sulfonation and/or reaction apparatus as the sulfonation or as the causing to act and reacting. Accordingly, the drying may be carried out as such in the sulfonation and/or reaction apparatus. In particular, within the procedure described above, the drying may be carried out with application of a linear or stagewise temperature increase, especially on attainment of the temperatures given below for the drying. The drying may also be carried out within the second or final temperature plateau according to step (a), as described above.

Drying, conversely, may also be carried out in a (drying) apparatus, more particularly a separate or separated apparatus, and may take place especially after the causing to act and reacting of the sulfonating agent with the starting material in the sulfonation and/or reaction apparatus. The drying may therefore be carried out as a separate step, especially after the causing to act and reacting of the sulfonating agent with the starting material.

In general, the drying ought also to be carried out at temperatures below the boiling or decomposition temperature of the sulfonating agent. The drying ought especially to be carried out at temperatures in the range from 100° C. to 330° C., especially in the range from 200° C. to 330° C., preferably in the range from 250° C. to 330° C. The drying may in general be carried out for a duration in the range from 0.5 h to 10 h, especially in the range from 1 h to 8 h, preferably in the range from 3 h to 7 h.

In accordance with the invention, moreover, provision may also be made that in step (a), after causing to act and reacting the sulfonating agent with the starting material and/or after drying of the sulfonated starting material and/or after implementation of step (a) and/ore before implementation of step (b), the sulfonated starting material is cooled. In this context, the sulfonated starting material may be cooled especially to temperatures in the range from 15° C. to 30° C.

According to one inventively preferred form of implementation, moreover, provision may be made that in step (a) after causing to act and reacting the sulfonating agent with the starting material and/or after drying of the sulfonated starting material and/or after cooling of the sulfonated starting material and/or after implementation of step (a) and/or before implementation of step (b) of the method according to the invention, leaving and/or repositing the sulfonated starting material is carried out.

In accordance with the invention, therefore, the sulfonated starting material may be subject to (interim) storage, as described above, this being associated with the aforesaid advantages of stockpiling of the sulfonated starting material and on-demand implementation of carbonization and activation. Moreover, the specific (interim) storage of the sulfonated starting material obtained in step (a) results, so to speak, in secondary maturation of the material.

In particular, the leaving or the repositing of the sulfonated starting material may be carried out at temperatures in the range from 15° C. to 30° C. and/or in ambient atmosphere (ambient air), especially air, or else under an inert atmosphere, especially under a nitrogen atmosphere. In general, however, the sulfonated starting material (sulfonate) may be stored in a natural ambient atmosphere, since in relation to the starting material there is no inertization and/or no premature exhaustion, owing for example to contamination or uptake of substances from the environment. In particular, the leaving and/or the repositing of the sulfonated starting material may take place at a relative atmospheric humidity in the range from 10 to 80%, especially 20 to 70%, preferably 30 to 65%, more preferably 40 to 60%.

In general, the leaving or the repositing of the sulfonated starting material may be carried out for a duration in the range from 0.5 day to 12 months, especially in the range from 1 day to 6 months, preferably in the range from 2 days to 3 months, more preferably in the range from 5 days to 1 month.

In particular, during the leaving or repositing, there may be secondary sulfonation (further (continued) sulfonation) and/or a subsequent or further (continued) volume increase (secondary swelling) of the sulfonated starting material. Without wishing to be limited to this theory, there is, within the secondary sulfonation and/or the subsequent volume expansion, a further reaction of the sulfonated starting material obtained in step (a) with the remaining sulfonating agent located especially in the pore system of the sulfonated starting material.

In this context, the applicant has found, entirely surprisingly, that as a result of the purposive secondary sulfonation and/or the subsequent volume expansion within the inventively envisaged leaving and/or repositing of the sulfonated starting material, the porosity can be further set and/or stipulated, a fact which is directly reflected, correspondingly, in the subsequently obtained product in the form of the inventive activated carbon. In particular, through the leaving and/or repositing, with the envisaged secondary sulfonation and/or with the downstream or subsequent volume expansion, it is possible to increase further the fraction of mesopores, relative to the total pore volume, in the inventively obtained actvated carbon. The leaving and/or repositing of the sulfonated starting material may be carried out generally as a part of step (a) of the method of the invention. During the leaving and/or repositing, indeed, there is in particular a further sulfonation with a causing to act and reacting of, in particular, residual sulfonating agent with the sulfonated starting material, hand in hand with the above-described subsequent volume expansion of the starting material (sulfonate).

With regard to the method of the invention, moreover, provision is made especially, within the present invention, that in step (a), or in the leaving and/or repositing, the starting material is furnished with chemical groups, especially strongly acidic chemical groups, preferably sulfonic acid groups. The groups in question are therefore generated, so to speak, in situ within the sulfonation as per method step (a).

In accordance with the invention, provision may be made in this context that the starting material is furnished with the chemical, especially strongly acidic chemical, groups, preferably sulfonic acid groups, in such a way that the weight ratio of the starting material to the chemical groups (starting material:chemical groups) is in the range from 4:1 to 1:2, especially in the range from 3:1 to 1:1.5, preferably in the range from 2:1 to 1:1.25. The formation of a defined weight ratio between starting material to chemical groups leads to a particularly defined pore size distribution in tandem with high attritional hardness and bursting strength of the activated carbon).

With regard to the starting material as such, it may be used especially in the form of a granular and/or spherical, especially spherical, starting material. In particular, the starting material may therefore be used in grain form and/or in sphere form, especially in sphere form.

In this context, the starting material may have a particle size, especially a particle diameter, in the range from 0.01 mm to 2.5 mm, especially in the range from 0.02 mm to 2 mm, preferably in the range from 0.05 mm to 1.5 mm, more preferably in the range from 0.1 mm to 1.25 mm, very preferably in the range from 0.15 mm to 1 mm, especially preferably in the range from 0.2 mm to 0.9 mm. In this context, at least 70 wt %, especially at least 80 wt %, preferably at least 85 wt %, more preferably at least 90 wt %, very preferably at least 95 wt %, of the particles of the starting material ought to have particle sizes, especially particle diameters, within the aforesaid ranges.

The starting material ought especially to have an average particle size D50, especially an average particle diameter (D50), in the range from 0.1 mm to 1.2 mm, especially in the range from 0.15 mm to 1 mm, preferably in the range from 0.2 mm to 0.9 mm, more preferably in the range from 0.25 mm to 0.8 mm, very preferably in the range from 0.3 mm to 0.7 mm.

The corresponding particle sizes may in particular be determined on the basis of the method according to ASTM D2862-97/04. Moreover, the aforesaid sizes may be determined by methods of determination based on sieve analysis, based on X-ray diffraction, on laser diffractometry or the like. The respective methods of determination are well known per se to the skilled person, and so require no further utterances. The determination takes place especially in accordance with the aforesaid method according to ASTM D2862-97/04.

With regard, moreover, to the volume expansion or volume increase of the sulfonated starting material, it behaves within the present invention in particular in such a way that the volume expansion (volume increase) of the starting material takes place on the basis of a chemical and/or physicochemical and/or physical volume expansion. In this regard, reference may be made to observations above.

The volume increase is generally associated with an increase in the particle diameter, especially in the average particle diameter (D50). In particular, provision may be made within the present invention that in step (a) the volume expansion (volume increase) of the starting material takes place in such a way that the particle size, especially the particle diameter, and/or the average particle size (D50), especially the average particle diameter (D50), of the sulfonated starting material is increased by at least 1%, especially at least 2%, preferably at least 5%, more preferably at least 10%, based on the particle size, especially the particle diameter, of the unsulfonated starting material and/or based on the average particle size (D50), especially the average particle diameter (D50), of the unsulfonated starting material (that is, of the starting material in the unsulfonated state that is used inventively in step (a)).

Within the sulfonation, therefore, the aim is for controlled or purposive volume expansion with the associated changes in the underlying pore system, this going hand in hand with the formation of defined activated carbons having specific porosity, especially pore size distribution.

In this context, in particular, the volume expansion (volume increase) of the starting material in step (a) may take place in such a way that the particle size, especially the particle diameter, and/or the average particle size (D50), especially the average particle diameter (D50), of the sulfonated starting material increases and/or is increased by a value in a range from 1% to 40%, especially in a range from 2% to 30%, preferably in a range from 3% to 20%, more preferably in a range from 4% to 15%, based on the particle size, especially the particle diameter, of the unsulfonated starting material in the unsulfonated state and/or based on the average particle size (D50), especially the average particle diameter (D50), of the unsulfonated starting material. In this context, it is possible for 1% to 50%, especially 2% to 45%, preferably 5% to 40%, more preferably 10% to 35% of the volume expansion (volume increase) of the sulfonated starting material, based on the total volume expansion, to be brought about by the optionally inventively envisaged leaving and/or repositing of the sulfonated starting material.

As recited above, provision may be made in accordance with the invention for the starting material itself, as such, to have a defined porosity and/or a pore system inherent in the material. Hence provision may be made in accordance with the invention that the starting material, especially in the form of the granular and/or spherical, especially spherical, starting material, is porous, especially microporous, and/or gel-like. On the basis of the porosity in the starting material, the sulfonating agent is able to penetrate into the starting material, accompanied by the formation of strongly acidic chemical groups, especially sulfonic acid groups, in the (interior) pore system of the starting material as well. In particular, the accessibility of the pore system for the sulfonating agent is further improved by the volume increase which occurs during the sulfonation, with an increase in the size of the pores in the starting material as well.

In particular, the starting material may have a micropore volume fraction, based on the total pore volume of the starting material, of at least 30%, especially at least 40%, preferably at least 50%, more preferably at least 60%, very preferably at least 70%. Equally, provision may be made in accordance with the invention that the starting material has a micropore volume fraction, based on the total pore volume of the starting material, in the range from 30% to 85%, especially in the range from 40% to 80%, preferably in the range from 50% to 75%. The methods of determination in this regard are well-known per se to the skilled person. In this regard, in particular, it is also possible to refer to the observations below relating to the inventive activated carbon, which are valid correspondingly for the method according to the invention.

In accordance with the invention, provision may be made in particular that the starting material used is a starting material based on organic polymers, especially based on divinylbenzene-crosslinked polystyrene, preferably based on styrene/divinylbenzene copolymers. In this context, the amount of divinylbenzene in the starting material may lie in the range from 0.1 wt % to 25 wt %, especially in the range from 0.5 wt % to 20 wt %, preferably in the range from 1 wt % to 15 wt %, more preferably in the range from 2 wt % to 10 wt %, based on the starting material. A material of this kind is especially suitable for use within the inventive method, since in particular it already possesses a defined pore system, which is especially accessible to the inventively envisaged sulfonation.

Within the present invention, moreover, it is possible for the starting material used to be a starting material based on ion exchange resin precursors. In this context, the starting material based on unsulfonated precursors, or on precursors at least substantially containing no sulfonic acid groups, of ion exchange resins can be used. Moreover, the ion exchange resin precursors may be of the gel type and/or microporous in form.

Within the present invention, provision may be made in principle, albeit less preferably, for precursors of ion exchange resins, or ion exchange resins themselves, that have already been sulfonated to be used, in which case they are then subjected to a further sulfonation especially in step (a) of the inventive method.

According to one inventive embodiment, moreover, provision may be made that in step (a), moreover, the starting material is peptized. This operation is more particularly one of extraction of monomeric, dimeric and/or oligomeric units that have remained in the starting material, and also, in particular, of deposition of the extracted units on the outer surface of the respective particles of the starting material. As a result, again, improved accessibility of the pore system is achieved, particularly in respect of the inventively employed sulfonating agent.

According to one embodiment particularly preferred in accordance with the invention, provision may be made that step (a) is carried out separately and/or with separation, especially spatially and/or temporally separately, from step (b) and/or from step (c), especially separately or with separation from step (b) and step (c). By this means, the sulfonating as such can also be optimized in respect of the envisaged volume expansion of the starting material. Moreover, the separate implementation of step (a) also allows the sulfonated starting material to be left and/or reposited. In this connection, in particular, step (a) may precede step (b) and/or step (c) as a separate, especially spatially and/or temporally separate step, or as a separated step. In particular, step (a) may be carried out in a separate apparatus, especially sulfonation and/or reaction apparatus, as described above.

Now further described hereinafter is step (b) of the inventive method, with the envisaged carbonization of the sulfonated starting material:

In particular, in step (b) the carbonization of the sulfonated starting material may be carried out in a separate apparatus and/or spatially and/or temporally separately from the sulfonating as per step (a).

In this connection, the sulfonated starting material may be introduced or transferred into at least one carbonization apparatus, especially into a rotary tube, preferably a rotary tube furnace, or into a belt furnace.

In general, therefore, in step (b) a carbonization apparatus, especially a rotary tube, preferably a rotary tube furnace, or a belt furnace may be used.

In this connection, provision may be made in accordance with the invention that the carbonization apparatus forms a closed system and/or that the carbonization apparatus can be operated under inert conditions and/or that the carbonization apparatus can be operated discontinuously, continuously or quasicontinuously, especially continuously or quasicontinuously. In this case the carbonization apparatus ought to be configured in such a way that the temperature of the carbonization apparatus can be regulated continuously or stagewise.

In the carbonization (also referred to synonymously as pyrolysis or roasting), there is generally a conversion of the carbonaceous starting polymers into carbon; i.e., in other words, the carbonaceous starting material is carbonized or charred. In the case of the carbonization of the aforementioned organic polymer grains, especially polymer spherules, which contain sulfonic acid groups, the elimination of the sulfonic acid groups during the carbonization leads to free radicals and therefore to crosslinking, without any pyrolysis residue (=carbon).

A "closed system" within the invention is intended to mean in particular a system which exchanges as little energy as possible with the environment Exchange of matter with the environment as well is to be very largely avoided or else at least minimized, apart from the supplied process gases (e.g., water vapor, carbon dioxide, etc.) and the gases taken off; exchange of matter, therefore, takes place only under precisely defined and controlled conditions.

In general, in step (b), the carbonization can be carried out at temperatures in the range from 100° C. to 1200° C., especially in the range from 150° C. to 1100° C., preferably in the range from 200° C. to 1000° C.

Moreover, the carbonization in step (b) may be carried out for a duration in the range from 0.5 h to 20 h, especially in the range from 0.75 h to 15 h, preferably in the range from 1 h to 10 h, more preferably in the range from 1.5 h to 8 h, very preferably in the range from 2 h to 6 h.

In this regard, the skilled person is in a position at any time to select and to harmonize with one another the corresponding methodological parameters with regard to the carbonization carried out.

In general, in step (b), the carbonization ought to be carried out under an inert (gas) atmosphere, especially under a nitrogen atmosphere, or at most under a slightly oxidizing atmosphere, especially as indicated above. Generally speaking, the use of a noble gas atmosphere may also be contemplated. As a result of the inert atmosphere, any unwanted, excessive oxidation and/or burn-out of the material used is avoided.

In particular, in step (b), the carbonization atmosphere, especially inert atmosphere, may be admixed during the carbonization with oxygen, especially in the form of air, especially in amounts in the range from 50 l/min to 100 l/min, especially at relatively high temperatures, preferably at temperatures in the range from 550° C. to 950° C. A carbonizing atmosphere modified in this way may be introduced in particular on the outlet side of the carbonization apparatus, especially in the form of a rotary tube furnace.

Moreover, provision may be made in accordance with the invention that in step (b) water, especially in the form of water vapor and/or an inert gas/water vapor mixture, preferably nitrogen/water vapor mixture, is added to the carbonizing atmosphere, especially inert atmosphere, during the carbonization, especially wherein the fraction of the water vapor in the inert gas/water vapor mixture is set in the range from 1 to 30 vol %, especially in amounts in the range from 50 l/min to 100 l/min. A carbonizing atmosphere modified with water in this way may be introduced in particular on the inlet side of the carbonization apparatus, especially in the form of a rotary tube furnace.

On the basis of this inventive procedure, it is possible in a controlled way to enable combustion in the carbonization apparatus of pyrolysis gases that are formed. As a result, the positive effect can be achieved that the condensing of pyrolysis gases in the base system of the starting material is largely prevented, leading to a further improvement in the product quality.

Moreover, in step (b), the carbonization may be carried out with application of a temperature gradient and/or a temperature profile. In this context, the temperature gradient and/or temperature profile may be formed temporally and/or spatially in the carbonization apparatus, especially in the form of temperature zones.

Generally, in accordance with the invention, the procedure is such that in step (b) the carbonization is carried out in such a way that the chemical groups, especially strongly acidic chemical groups, preferably sulfonic acid groups, are thermally decomposed, especially with formation of free radicals and/or with formation of crosslinks, and/or are eliminated from the sulfonated starting material. In this way, in particular, there is an onset of the carbonization and/or a thermal decomposition of the starting material, preferably with crosslinking of the polymers of the starting material and/or with formation of carbon. In particular, in step (b), the carbonization may be carried out in such a way that in particular after the thermal decomposition and/or the elimination of the chemical groups, especially the strongly acidic chemical groups, preferably the sulfonic acid groups, there is especially further-reaching and/or especially complete carbonization of the starting material. In this way, there results, so to speak, a charred starting material or carbonized material with a corresponding carbon framework, this material being present in particular in desulfonated form in view of the thermal decomposition of the above-recited sulfonic acid groups.

In this connection, provision may be made in accordance with the invention that the thermal decomposition and/or the elimination of the chemical groups, especially of the strongly acidic chemical groups, preferably of the sulfonic acid groups, takes place especially in a first temperature zone of the carbonization apparatus and/or at temperatures in the range from 100° C. to 600° C., especially in the range from 150° C. to 500° C.

In this connection, moreover, provision may be made that the further or complete carbonization of the starting material takes place in a second temperature zone of the carbonization apparatus. In particular, the second temperature zone may be disposed especially in the processing direction and/or downstream of the first temperature zone. Moreover, the further or complete carbonizing of the starting material may take place at temperatures in the range from 400° C. to 1200° C., especially in the range from 500° C. to 1000° C. On this basis, it is possible to effect an at least substantially complete conversion of the starting material into carbon.

Within the present invention, moreover, provision may be made that the carbonized starting material (activated material) obtained in method step (b) is subjected to a subsequent cooling, especially to temperatures in the range from 15° C. to 30° C. The carbonized starting material (activated material) may therefore be cooled prior to implementation of step (c) with the relevant activation, especially to temperatures in the range from 15° C. to 30° C.

Furthermore, for further details relating to the inventively implemented carbonizing, reference may be made in particular to international patent application WO 98/07655 A1 and also to the parallel patent applications DE 196 53 238 A1, DE 196 50 414 A1, and to EP 0 952 960 A1 and U.S. Pat. No. 6,300,276 B1 belonging to the same patent family; the respective disclosure contents of each of these patent documents is hereby included in its entirety by reference. Moreover, reference may be made to DE 43 04 026 A1 and to U.S. Pat. No. 6,184,177 B1 belonging to the same patent family, the respective disclosure contents of each of these patent documents being likewise hereby incorporated in its entirety by reference.

Now, in the text below, a further description is given of the inventively envisaged activation as per step (c):

In particular, in step (c), the activation of the carbonized starting material may likewise be carried out in the carbonization apparatus (carbonization and/or activation apparatus), especially as defined above. In accordance with the invention, however, it is also possible that the activation of the carbonized starting material is carried out in a separate activation apparatus and/or spatially and/or temporally separately from the carbonization.

In this context, the carbonized starting material may be introduced or transferred in step (c) into an activation apparatus, especially into a rotary tube, preferably a rotary tube furnace. In particular, in step (c), an activation apparatus may be used, especially a rotary tube, preferably a rotary tube furnace.

In particular, the procedure adopted in step (c) may be such that the activation is carried out in the presence of at least one activating gas, especially oxygen, especially in the form of air, water vapor and/or carbon dioxide, or mixtures of these activating gases, and/or in the presence of an inert gas/water vapor mixture, preferably nitrogen/water vapor mixture, and/or in the presence of carbon dioxide, especially pure carbon dioxide, or an inert gas/carbon dioxide mixture, especially a nitrogen/carbon dioxide mixture.

The basic principle of the inventively envisaged activation as per step (c) is that of carrying out selective and targeted breakdown and/or burn-out, under suitable conditions, of a part of the carbon that is generated during the carbonization. As a result, the pore system is further formed and, so to speak, finalized, with a further increase in the surface area per unit mass. In the activating, therefore, a targeted burn-out of the carbon is undertaken. Given that carbon is broken down during the activation, this procedure is accompanied by a loss of substance which, under optimum conditions, is synonymous with a rise in the porosity and increase in the internal surface area and the pore volume of the resulting activated carbon. The activation therefore takes place in particular under selective and/or controlled oxidizing conditions. As a consequence of the activation, therefore, the pore system of the starting material is, so to speak, further modified and/or further formed.

With regard to the activating gas used in the activation, it may in particular have a fraction of the water vapor in the inert gas/water vapor mixture in the range from 1 vol % to 70 vol %, or the relevant range can be set.

In this connection, the throughput of water vapor ought to lie in the range from 1 $m^3$/h to 500 $m^3$/h, especially in the range from 20 $m^3$/h to 400 $m^3$/h, based on pure water vapor.

In particular, the throughput of water vapor per unit mass ought to lie in the range from 0.01 l/(h·kg) to 50 l/(h·kg), especially in the range from 0.02 l/(h·kg) to 25 l/(h·kg), calculated as water and based on the amount of starting material to be activated with water vapor (carbonized material).

In particular, the throughput of nitrogen ought to lie in the range from 0.5 $m^3$/h to 100 $m^3$/h, especially in the range from 1 $m^3$/h to 50 $m^3$/h, preferably in the range from 2 $m^3$/h to 20 $m^3$/h, based on pure nitrogen.

In particular, the throughput of nitrogen ought to lie in the range from 0.01 l/(h·kg) to 30 l/(h·kg), especially in the range from 0.02 l/(h·kg) to 20 l/(h·kg), calculated as nitrogen and based on the amount of starting material to be activated (carbonized material).

In particular, the throughput of carbon dioxide ought to be in the range from 5 $m^3$/h to 250 $m^3$/h, especially 10 $m^3$/h to 200 $m^3$/h, based on pure carbon dioxide, and/or wherein the throughput of carbon dioxide per unit mass ought to lie in the range from 0.001 $m^3$/(h·kg) to 100 $m^3$/(h·kg), especially in the range from 0.01 $m^3$/(h·kg) to 50 $m^3$/(h·kg), calculated as pure gaseous carbon dioxide under activating conditions and based on the amount of starting material to be activated with carbon dioxide (carbonized material).

In general, the activating in step (c) may be carried out at temperatures in the range from 700 to 1200° C., especially in the range from 800° C. to 1100° C., preferably in the range from 850° C. to 1000° C., more preferably in the range from 900 to 975° C.

In particular, the activating in step (c) may be carried out for a duration in the range from 0.5 h to 20 h, especially in the range from 1 h to 15 h, preferably in the range from 2 h to 10 h. The skilled person is able at any time to select accordingly the parameters in the context of the activation and to harmonize them with one another, and so in this regard there is no need for any further observations.

In accordance with the invention, moreover, provision may be made that in step (c) the activating is carried out in multiple stages, especially two stages. In this context, the carbonized starting material may first be subjected in a first activating step to activation in a water vapor-containing atmosphere, followed by a second activating step of activation in a carbon dioxide-containing atmosphere.

In this context, the first activating step may be carried out at temperatures in the range from 700° C. to 1200° C., especially in the range from 800° C. to 1100° C., preferably in the range from 850° C. to 950° C., and/or for a duration in the range from 5 h to 24 h, preferably in the range from 6 h to 15 h, especially in the range from 6 h to 12 h.

As far as the atmosphere of the first activating step is concerned, it may comprise or consist of water vapor, especially an inert gas/water vapor mixture, preferably a nitrogen/water vapor mixture. In this context, the throughput of water vapor may lie in the range from 25 m$^3$/h to 350 m$^3$/h, especially in the range from 50 m$^3$/h to 300 m$^3$/h, based on pure water vapor.

In particular, moreover, the second activating step may be carried out at temperatures in the range from 700° C. to 1200° C., especially in the range from 800° C. to 1100° C., preferably in the range from 850° C. to 950° C., and/or for a duration in the range from 1 h to 10 h, especially 3 h to 8 h.

Moreover, the atmosphere of the second activating step may comprise or consist of carbon dioxide, especially of pure carbon dioxide or of a mixture of carbon dioxide/inert gas, especially a mixture of carbon dioxide/nitrogen. In this context, the throughput of carbon dioxide may be 10 m$^3$/h to 250 m$^3$/h, especially 20 m$^3$/h to 200 m$^3$/h, based on pure carbon dioxide.

In particular, within the two-stage activation, a procedure may be adopted which is such that the first and second activating steps merge into one another.

With regard to the optionally envisaged two-stage activation, whereby the carbonized starting material is first subjected, in a first activating step, to activation in a water vapor-containing atmosphere, followed by a second activating step in a carbon dioxide-containing atmosphere, this procedure results in a further optimization of the inventively obtained products in the form of the activated carbon. In particular it is possible on the basis of this methodological regime to achieve a high total porosity with high mesopore and/or macropore volume fraction, or high mesopore volume fraction, while at the same time a high mechanical stability is ensured for the activated carbon obtained in this way.

With regard, furthermore, to step (c) of the inventive method, activation of the carbonized starting material may be followed by cooling of the resultant activated carbon in the form of the carbonizate, especially to temperatures in the range from 15° C. to 30° C.

Furthermore, for further details relating to the inventively implemented activating, reference may be made in particular to international patent application WO 98/07655 A1 and also to the parallel patent applications DE 196 53 238 A1, DE 196 50 414 A1, and to EP 0 952 960 A1 and U.S. Pat. No. 6,300,276 B1 belonging to the same patent family; the respective disclosure contents of each of these patent documents is hereby included in its entirety by reference. Moreover, reference may be made to DE 43 04 026 A1 and to U.S. Pat. No. 6,184,177 B1 belonging to the same patent family, the respective disclosure contents of each of these patent documents being likewise hereby incorporated in their entirety by reference.

In the context of the present invention, therefore, what is provided overall is a method for producing activated carbon, more particularly a Polymer-based Spherical Activated Carbon (PBSAC), with the activated carbons thus obtained having an increased mesopore or macropore volume fraction, more particularly an increased mesopore volume fraction.

The method of the invention may be executed in particular as follows:

In accordance with the invention, for example, a general procedure may be adopted whereby the sulfonating is carried out separately from the carbonizing and activating, or such that all the steps, namely sulfonating, carbonizing, and activating, are carried out individually or separately, with the (intermediate) product obtained in each case being cooled and being removed from the apparatus on which the method step conducted is based, in particular for purposes of its transfer into the apparatus of the following step.

Furthermore, a central concept of the methodological regime of the invention is that during the sulfonating, a relatively long contact time is selected between the starting material on the one hand and the sulfonating agent, especially in the form of oleum and sulfuric acid, on the other, and that the resulting sulfonated starting material or sulfonate, after sulfonating has been carried out, is optionally dried, especially at temperatures of around 100° C. to 330° C. for a duration of 0.5 h to 10 h (cf. observations above). In this context it has surprisingly been found in accordance with the invention that the inventive procedure results in production of an activated carbon having a high mesopore and/or macropore volume fraction, or with a high mesopore volume fraction, after activation, and hence overall a material having increased mesoporosity. Equally, within the procedure according to the invention, there is a certain size increase on the part of the particles, as noted above.

Moreover, it has been found, entirely surprisingly, that a corresponding repositing or leaving, and therefore a further storage, of the sulfonated starting material obtained from the sulfonating leads to a further volume expansion and/or to secondary sulfonation, in tandem with a correspondingly further modification and/or improvement in the materials properties of the activated carbon obtained on the basis of the method of the invention.

In particular, it is possible in accordance with the invention to proceed in such a way that the carbonizing is carried out continuously, and the sulfonate initially obtained, which can be produced batchwise, for example, and which before the carbonizing and activating are carried out is subjected to corresponding storage, is introduced into a continuously operating furnace, especially on the basis of a rotary tube furnace, and is conveyed continuously through the furnace at a uniform rate, with the material to be carbonized passing through a variety of heating zones and/or temperature zones, and becoming carbonized in the process. On the basis of the activating carried out subsequently, the activated carbons of the invention with the corresponding properties are then obtained.

A further subject of the present invention, moreover—according to a second aspect of the present invention—is an activated carbon, especially particulate activated carbon, preferably granular and/or spherical, more preferably spherical, activated carbon, with increased mesopore and/or macropore volume fraction, preferably with increased mesopore volume fraction, wherein the activated carbon is obtainable by the above-described method according to the invention.

As far as the activated carbon or activated-carbon particles (also referred to hereinafter simply as activated carbon) according to the invention are concerned as such, the parameter details given in relation to them are determined using standardized or explicitly stated methods of determination or by methods of determination that are familiar per se to the skilled person. In particular, the parameter details relating to the characterization of the porosity or the pore size distribution, and other adsorption properties, are generally obtained in each case from the corresponding nitrogen sorption isotherms of the relevant activated carbon or of the products subjected to measurement. Moreover, the pore distribution, in relation in particular to the amount of pores of defined size relative to the total pore volume, in particular, can be determined on the basis of DIN 66135-1.

With regard, furthermore, to the activated carbon according to the invention that is obtainable by the method of the invention, provision may be made in this regard that the activated carbon according to the invention has a total pore volume, especially a Gurvich total pore volume, of at least 0.5 cm$^3$/g, especially at least 0.75 cm$^3$/g, preferably at least 1 cm$^3$/g, more preferably at least 1.25 cm$^3$/g, very preferably at least 2 cm$^3$/g.

The determination of the Gurvich total pore volume is a method of measurement/determination that is well known per se to a person skilled in this field of art. For further details concerning the determination of the Gurvich total pore volume, reference may be made, for example, to L. Gurvich (1915), *J. Phys. Chem. Soc. Russ.* 47 805, and also to S. Lowell et aL, *Characterization of Porous Solids and Powders: Surface Area Pore Size and Density*, Kluwer Academic Publishers, Article Technology Series, pages 111 ff. In particular, the pore volume of the activated carbon can be determined on the basis of the Gurvich rule in accordance with the formula $V_p = W_a/\rho_l$, where $W_a$ is the adsorbed quantity of an underlying adsorbate and $\rho_l$ is the density of the adsorbate used (cf. also formula (8.20) as per page 111, section 8.4.) of S. Lowell et al.).

Moreover, provision may be made within the present invention that 15% to 85%, especially 20% to 80%, preferably 25% to 75%, more preferably 30% to 70%, of the total pore volume, especially of the Gurvich total pore volume, of the activated carbon is formed by pores having pore diameters in the range from 2 nm to 100 nm, especially in the range from 2 nm to 50 nm.

Moreover, provision may be made within the present invention that the activated carbon according to the invention has an abrasion resistance (also referred to synonymously as attritional hardness) of at least 95%, especially at least 96%, preferably at least 97%, more preferably at least 98%, very preferably at least 99%, especially preferably at least 99.5%, especially determined according to modified CEFIC standard.

In spite of the high porosity, especially the high meso- and/or macroporosity, more particularly mesoporosity, the activated carbons of the invention have a high compressive strength or bursting strength (capacity to withstand weight loading) and also an extremely high abrasion resistance or attritional hardness.

Accordingly, the abrasion resistance by the CEFIC method (Conseil Européen des Fédérations de l'Industrie Chimique, Avenue Louise 250, Bte 71, B—1050 Brussels, November 1986, European Council of Chemical Manufacturers' Federations, Test Methods for Activated Carbons, section 1.6 "Mechanical hardness", pages 18/19) is always 100%. According to ASTM D3802 as well, abrasion resistances consistently of 100% are obtained by the activated carbons of the invention.

The applicant has therefore developed a modified test method along the lines of this CEFIC method, in order that more meaningful values may be obtained. The modified method of determination provides a better simulation of the resistance of the sample or of the activated carbon to abrasion or attrition under near-actual-service conditions. For this purpose, the sample is exposed to standardized conditions for a defined time in a horizontally swinging grinding cup charged with a tungsten carbide ball. The procedure adopted for this purpose is as follows: 200 g of a sample are dried for one hour at (120±2°) C. in a forced air drying cabinet (model: Heraeus UT 6060 from Kendro GmbH, Hanau) and are subsequently cooled down in a desiccator over drying agent to room temperature. 50 g of the dried sample are removed and sieved off by means of a sieving machine equipped with an analytical sieve (model: AS 200 control from Retsch GmbH, Hanau) at a swing amplitude of 1.2 mm for ten minutes through an analytical sieve (analytical sieve of mesh size: 0.315 mm, diameter: 200 mm, height 50 mm); the undersize grain is discarded. 5 ml of the nominal grain are filled into a 10 ml graduated cylinder according to DIN ISO 384 (volume: 10 ml, height: 90 mm) and the weight is determined accurately to 0.1 mg using an analytical balance (model: BP121S from Sartorius AG, Göttingen, weighing range: 120 g, accuracy class: E2, readability: 0.1 mg) by means of a weighing glass having a ground glass lid (volume: 15 ml, diameter: 35 mm, height 30 mm). The weighed sample is placed, together with a tungsten carbide grinding ball with a diameter of 20 mm, into a 25 ml grinding cup with screw-action closure (volume: 25 ml, diameter: 30 mm, length: 65 mm, material: stainless steel) and then the abrasion test is carried out by means of a vibratory mill (model: MM301 from Retsch GmbH, Haan, swing mill with grinding cup); the grinding cup here swings in a horizontal position for one minute at a frequency of 10 Hz in the vibratory mill, causing the grinding ball to impact on the sample and thus create abrasion. The sample is subsequently sieved off by means of a sieving machine at a swing amplitude of 1.2 mm for five minutes through the aforementioned analytical sieve, the undersize grain again being discarded, and the nominal grain of greater than 0.315 mm being weighed back accurately to 0.1 mg in the lidded weighing glass. The attritional hardness is calculated as a mass fraction in % by the following formula: attritional hardness [%]=(100×back-weighed weight [g])/original weight [g].

In this context, the present invention also relates to the activated carbon of the invention as such:

Consequently, a further subject of the present invention is the activated carbon of the invention, especially particulate activated carbon, preferably granular and/or spherical, more preferably spherical, activated carbon, with increased mesopore and/or macropore volume fraction, preferably with increased mesopore volume fraction, especially as defined above, wherein the activated carbon has a total pore volume, especially a Gurvich total pore volume, of at least 0.5 cm$^3$/g, especially at least 0.75 cm$^3$/g, preferably at least 1 cm$^3$/g, more preferably at least 1.25 cm$^3$/g, very preferably at least 2 cm$^3$/g, wherein 15% to 85%, especially 20% to 80%, preferably 25% to 75%, more preferably 30% to 70%, of the total pore volume, especially of the Gurvich total pore volume, of the activated carbon is formed by pores having pore diameters in the range from 2 nm to 100 nm, especially in the range from 2 nm to 50 nm; and wherein the activated carbon has an abrasion resistance of at least 95%, especially at least 96%, preferably at least 97%, more preferably at least 98%, very preferably at least 99%, especially preferably at least 99.5%, especially determined according to modified CEFIC standard.

In accordance with the invention, provision may especially be made that 60% to 99.5%, especially 60% to 99%, preferably 80% to 98%, more preferably 90% to 95%, of the total pore volume formed by pores having pore diameters in the range from 2 nm to 50 nm, especially of the Gurvich total pore volume formed by pores having pore diameters in the range from 2 nm to 50 nm, in the activated carbon is formed by pores having pore diameters in the range from 2 nm to 20 nm, especially in the range from 2 nm to 10 nm, preferably in the range from 2 nm to 5 nm, more preferably in the range from 2.5 nm to 4.5 nm.

In particular, provision may be made that at least 60%, especially at least 70%, preferably at least 80%, more preferably at least 90%, very preferably at least 95%, especially preferably at least 98%, with further preference at least 99%, with even further preference at least 99.5%, of the total pore volume formed by pores having pore diameters in the range from 2 nm to 100 nm, especially in the range from 2 nm to 50 nm, in the activated carbon, and/or of the Gurvich total pore volume formed by pores having pore diameters in the range from 2 nm to 100 nm, especially in the range from 2 nm to 50 nm, in the activated carbon is formed by pores having pore diameters in the range from 2 nm to 20 nm, especially in the range from 2 nm to 10 nm, preferably in the range from 2 nm to 5 nm, more preferably in the range from 2.5 nm to 4.5 nm.

In accordance with the invention, therefore, an actuated carbon having a high fraction of mesopores and/or macropores, especially mesopores, among the total pore volume of the activated carbon is provided in a targeted way, and so the activated carbon of the invention has very specific adsorption properties. Accordingly, the activated carbon according to the invention is contemplated for numerous applications, especially as defined hereinafter.

In general the activated carbon according to the invention may have a total pore volume, especially a Gurvich total pore volume, of at most 4 cm$^3$/g, especially at most 3.75 cm$^3$/g, preferably at most 3.5 cm$^3$/g, more preferably at most 3.25 cm$^3$/g, very preferably at most 3 cm$^3$/g.

In this context, the activated carbon may have a total pore volume, especially a Gurvich total pore volume, in the range from 0.5 cm$^3$/g to 4 cm$^3$/g, especially in the range from 0.75 cm$^3$/g to 3.75 cm$^3$/g, preferably in the range from 1 cm$^3$/g to 3.5 cm$^3$/g, more preferably in the range from 1.5 cm$^3$/g to 3.25 cm$^3$/g, very preferably in the range from 2 cm$^3$/g to 3 cm$^3$/g.

Moreover, the activated carbon of the invention is also distinguished by a very high BET surface area:

Hence provision may be made in accordance with the invention that the activated carbon has a specific BET surface area in the range from 500 m$^2$/g to 4500 m$^2$/g, especially in the range from 600 m$^2$/g to 4000 m$^2$/g, preferably in the range from 800 m$^2$/g to 3500 m$^2$/g, very preferably in the range from 1000 m$^2$/g to 3000 m$^2$/g, especially preferably in the range from 1200 m$^2$/g to 2500 m$^2$/g.

In particular, the activated carbon may have a surface area, especially BET surface area, formed by pores having pore diameters in the range from 2 nm to 100 nm, in the range from 500 to 4000 m$^2$/g, especially in the range from 600 to 3500 m$^2$/g, preferably in the range from 700 to 3000 m$^2$/g, more preferably in the range from 800 to 2500 m$^2$/g.

Furthermore, the activated carbon according to the invention may have a surface area, especially BET surface area, formed by pores having pore diameters in the range from 2 nm to 50 nm, in the range from 300 to 2000 m$^2$/g, especially in the range from 400 to 1900 m$^2$/g, preferably in the range from 500 to 1800 m$^2$/g, more preferably in the range from 600 to 1700 m$^2$/g.

Moreover, the activated carbon according to the invention may have an average pore diameter in the range from 2 nm to 60 nm, especially 2 nm to 40 nm, preferably 3 nm to 20 nm, more preferably 3 nm to 15 nm.

The determination of the specific surface area as per BET is fundamentally known per se to the skilled person, and so in this respect there are no further details that need be given. All of the BET surface area details refer to the determination according to ASTM D6556-04.

Within the present invention, the method used for determining the BET surface area—in general and except where expressly indicated otherwise—is that known as the multipoint BET determination method (MP-BET) in a partial pressure range $p/p_0$ from 0.05 to 0.1.

For further details regarding the determination of the BET surface area or the BET method, reference may be made to the aforementioned ASTM D6556-04 and also to Römpp Chemielexikon, 10$^{th}$ edition, Georg Thieme Verlag, Stuttgart/New York, entry heading: "BET-Methode", including the literature referenced therein, and to Winnacker-Küchler (3$^{rd}$ edition), volume 7, pages 93 ff., and also to Z. Anal. Chem. 238, pages 187 to 193 (1968).

In accordance with the invention, moreover, provision may be made that the activated carbon according to the invention has a pore volume, especially carbon blade pore volume, formed by pores having pore diameters in the range from 2 nm to 100 nm, especially in the range from 2 nm to 50 nm, in the range from 0.1 cm$^3$/g to 2.75 cm$^3$/g, especially in the range from 0.2 cm$^3$/g to 2.5 cm$^3$/g, preferably in the range from 0.3 cm$^3$/g to 2 cm$^3$/g.

The carbon black determination method is known per se to the skilled person, and for further details regarding the determination of the pore surface area and the carbon black pore volume, reference may be made, for example, to R. W. Magee, *Evaluation of the External Surface Area of Carbon Black by Nitrogen Adsorption, Presented at the Meeting of the Rubber Division of the American Chem. Soc.*, October 1994, which is referenced for example in: *Quantachrome Instruments, AUTOSORB-1, AS*1 *Win Version* 1.50, *Operating Manual, OM,* 05061, *Quantachrome Instruments* 2004, Florida, USA, pages 71 ff. In particular, the relevant evaluation may be made using the t-plot method.

Furthermore, the activated carbon of the invention may have a carbon black pore surface area formed by pores having pore diameters in the range from 2 nm to 100 nm, especially in the range from 2 nm to 50 nm, of at least 1200 m$^2$/g, especially at least 1400 m$^2$/g, preferably at least 1600 m$^2$/g.

Moreover, the activated carbon according to the invention may have a carbon black pore surface area formed by pores having pore diameters in the range from 2 nm to 100 nm, especially in the range from 2 nm to 50 nm, in the range from 1200 m$^2$/g to 2000 m$^2$/g, especially in the range from 1400 m$^2$/g to 1900 m$^2$/g, preferably in the range from 1600 m$^2$/g to 1900 m$^2$/g.

Overall, the activated carbon according to the invention has outstanding adsorption properties, which are also characterized by the specifications hereinafter:

Accordingly, the activated carbon according to the invention may have a butane adsorption of at least 35%, especially at least 40%, preferably at least 45%. In this context, the activated carbon according to the invention may have a butane adsorption in the range from 35% to 90%, especially in the range from 40% to 85%, preferably in the range from 45% to 80%. The butane adsorption may be determined especially according to ASTM D5742-95/00.

Furthermore, the activated carbon according to the invention may have an iodine number of at least 1350 mg/g, especially at least 1400 mg/g, preferably at least 1450 mg/g. Furthermore, the activated carbon according to the invention may have an iodine number in the range from 1350 mg/g to 2200 mg/g, especially in the range from 1400 mg/g to 2100 mg/g, preferably in the range from 1450 mg/g to 2000 mg/g. The iodine number may be determined especially according to ASTM D4607-94/99. The iodine number may be rated as a measure of the available surface area that is also provided predominantly by small mesopores; the aforementioned iodine number values show that the activated carbons of the invention possess a high mesoporosity.

Owing to the high meso- and macroporosity, especially mesoporosity, the activated carbon of the invention similarly has high methylene blue and molasses adsorption numbers, which together can be taken as a measure of the available surface area which is provided predominantly by mesopores and macropores. Thus the methylene blue number or methylene blue adsorption, which identifies the amount of methylene blue adsorbed per defined amount of adsorbents under defined conditions (i.e., the volume or the number of ml of a methylene blue standard solution that are decolorized by a defined amount of dry and pulverized adsorbents) relates to predominantly relatively small mesopores and provides an indication of the adsorption capacity of the activated carbon of the invention in relation to molecules which possess a size comparable with that of methylene blue. By contrast, the molasses number is rated as a measure of the meso- and macroporosity and identifies the amount of adsorbance which is needed in order to decolorize a standard molasses solution, and so the molasses number gives an indication of the adsorption capacity of the activated carbon of the invention in relation to molecules which possess a size comparable with that of molasses (generally sugar beet molasses). Together, therefore, the methylene blue number and molasses number may be considered a measure of the meso- and macroporosity, especially mesoporosity, of the activated carbon of the invention.

The activated carbon according to the invention may in this context have a methylene blue value of at least 17 ml, especially at least 18 ml, preferably at least 19 ml. In particular, the activated carbon may have a methylene blue value in the range from 17 ml to 65 ml, especially in the range from 18 ml to 55 ml, preferably in the range from 19 ml to 50 ml.

The methylene blue value may be determined according to the method of CEFIC (Conseil Européen des Fédérations des l'Industrie Chimique, Avenue Louise 250, Bte 71, B—1050 Brussells, November 1986, European Council of Chemical Manufacturers' Federations, Test methods for activated carbons, section 2.4 "Methylene blue value", pages 27/28).

The methylene blue value according to the aforesaid CEFIC method is therefore defined as the number of ml of a methylene blue standard solution which are decolorized by 0.1 g of dry and pulverized activated carbon. Performing this method requires a glass vessel with ground stopper, a filter, and a methylene blue standard solution, which is prepared as follows: a quantity of 1200 mg of pure methylene blue dye (corresponding to about 1.5 g of methylene blue according to DAB VI [German Pharmacopeia, 6$^{th}$ edition] or equivalent product) are dissolved in water in a 1000 ml volumetric flask, and the solution is allowed to stand for several hours or overnight; to check its strength, 5.0 ml of the solution are made up to 1.01 with 0.25% (volume fractions) acetic acid in a volumetric flask, and thereafter the absorbance is measured at 620 nm and 1 cm path length, and is required to be (0.840±0.010). If the absorbance is higher, dilution is carried out with the calculated amount of water; if it is lower, the solution is discarded and made up anew. For sample preparation, the activated carbon is pulverized (<0.1 mm) and then dried to constant weight at 150° C. Exactly 0.1 g of the spherocarbon is combined with 25 ml (5 ml) of the methylene blue standard solution in a ground glass flask (a preliminary test is carried out to determine whether an initial addition of 25 ml of methylene blue standard solution with 5 ml additions, or an initial addition of 5 ml of methylene blue standard solution with 1 ml additions, can be used). The flask is shaken until decolorization occurs. Then a further 5 ml (1 ml) of the methylene blue standard solution are added, and the flask is shaken until decolorization occurs. The addition of methylene blue standard solution in 5 ml quantities (1 ml quantities) is repeated for as long as decolorization still occurs within 5 minutes. The total volume of the test solution which has been decolorized by the sample is recorded. The testis repeated to confirm the results obtained. The volume of the methylene blue standard solution in ml which is still just decolorized is the methylene blue value of the activated carbon. It should be noted in this context that the methylene blue dye must not be dried, since it is heat-sensitive; instead, the water content must be corrected for by purely arithmetic means.

Furthermore, the activated carbon may have a molasses number of at least 250, especially at least 300, preferably at least 350, and/or wherein the activated carbon have a molasses number in the range from 250 to 1500, especially in the range from 300 to 1400, preferably in the range from 350 to 1300, especially preferably in the range from 500 to 1250.

The dimensionless molasses number may in principle be determined either by the Norit method (Norit N.V., Amersfoort, the Netherlands, Norit standard method NSTM 2.19 "Molasses Number (Europe)") or alternatively by the PACS method (PACS=Professional Analytical and Consulting Services Inc., Coraopolis Pa., USA). For the purposes of the present invention, the values for the molasses number are determined according to the PACS method.

In the determination of the molasses number by the Norit or PACS method, a determination is made of the amount of pulverized activated carbon required in order to decolorize a standard molasses solution. The determination is made photometrically, with the standard molasses solution being standardized against a standardized activated carbon having a molasses number of 245 and/or 350. For further details in this respect, reference may be made to the two aforesaid protocols.

Additionally, the weight-based and volume-based volume $V_{ads}(N_2)$ of the activated carbon of the invention at different partial pressures $p/p_0$ is very large, this equally being considered evidence of the outstanding adsorption properties of the inventively provided activated carbon.

In this context, the activated carbon may have an adsorbed $N_2$ volume per unit weight $V_{ads(wt)}$, determined at a partial pressure $p/p_0$ of 0.25, of at least 250 cm$^3$/g, especially at least 300 cm$^3$/g, preferably at least 350 cm$^3$/g.

In particular the activated carbon may have an adsorbed $N_2$ volume per unit weight $V_{ads(wt)}$, determined at a partial pressure $p/p_0$ of 0.25, in the range from 250 cm$^3$/g to 850 cm$^3$/g, especially in the range from 300 cm$^3$/g to 700 cm$^3$/g, preferably in the range from 375 cm$^3$/g to 650 cm$^3$/g.

Equally, the activated carbon may have an adsorbed $N_2$ volume per unit volume $V_{ads\ (vol)}$, determined at a partial pressure $p/p_0$ of 0.25, of at least 50 cm³/cm³, especially at least 100 cm³/cm³.

In this context, the activated carbon according to the invention may have an adsorbed $N_2$ volume per unit volume $V_{ads\ (vol)}$, determined at a partial pressure $p/p_0$ of 0.25, in the range from 50 cm³/cm³ to 300 cm³/cm³, especially in the range from 80 cm³/cm³ to 275 cm³/cm³, preferably in the range from 90 cm³/cm³ to 250 cm³/cm³.

Moreover, the activated carbon according to the invention may have an adsorbed $N_2$ volume per unit weight $V_{ads\ (wt)}$, determined at a partial pressure $p/p_0$ of 0.995, of at least 300 cm³/g, especially at least 450 cm³/g.

Furthermore, the activated carbon may have an adsorbed $N_2$ volume per unit weight $V_{ads(wt)}$, determined at a partial pressure $p/p_0$ of 0.995, in the range from 300 cm³/g to 2300 cm³/g, especially in the range from 450 cm³/g to 2200 cm³/g, preferably in the range from 750 cm³/g to 2100 cm³/g.

Furthermore, the activated carbon may have an adsorbed $N_2$ volume per unit volume $V_{ads\ (vol)}$, determined at a partial pressure $p/p_0$ of 0.995, of at least 200 cm³/cm³, especially at least 250 cm³/cm³.

In particular, the activated carbon may have an adsorbed $N_2$ volume per unit volume $V_{ads\ (vol)}$, determined at a partial pressure $p/p_0$ of 0.995, in the range from 200 cm³/cm³ to 500 cm³/cm³, especially in the range from 250 cm³/cm³ to 400 cm³/cm³, preferably in the range from 275 cm³/cm³ to 380 cm³/cm³.

As noted above, the activated carbon according to the invention also has outstanding mechanical properties, especially a high mechanical stability.

In this context, the activated carbon may have a compressive strength or bursting strength per activated carbon grain, especially per activated carbon spherule, of at least 5 newtons, especially at least 10 newtons, preferably at least 15 newtons.

In this context, the activated carbon may have a compressive strength or bursting strength per activated carbon grain, especially per activated carbon spherule, in the range from 5 to 50 newtons, especially in the range from 10 to 45 newtons, preferably in the range from 15 to 40 newtons.

As noted above, the volume expansion of the starting material, this expansion being provided for in the context of the very specific sulfonation in the manner of the invention, also leads to correspondingly larger or increased particle diameters on the part of the activated carbon as such, especially as compared with activated carbon based on comparable starting materials which have not been subjected to any volume expansion.

In particular, provision may be made within the present invention that the activated carbon has an average particle size (D50), especially an average particle diameter (D50), in the range from 0.1 mm to 1.3 mm, especially 0.15 mm to 1.2 mm, preferably 0.2 mm to 1 mm, more preferably 0.25 mm to 0.9 mm, very preferably 0.3 mm to 0.8 mm.

The determination of the particle sizes may be determined here on the basis of ASTM D2862-97/04. Moreover, reference may be made to the observations above concerning the starting material, which are valid correspondingly.

In particular, within the present invention, in comparison to an activated carbon which is not produced using the method of the invention and/or for which there is no volume expansion of the starting material within the sulfonation and for which comparable particle sizes are employed for the starting material used, the activated carbon of the invention has an average particle size D50 which is greater by at least 1%, especially at least 2%, preferably at least 5%, more preferably at least 10%, more particularly a correspondingly larger average particle diameter D50, relative to the comparative activated carbon.

All in all, therefore, activated carbons are provided in the context of the present invention that unite the diametrally opposed properties of a defined porosity with high meso- and/or macroporosity, especially mesoporosity, in conjunction with high total pore volume, on the one hand, and a high mechanical stability, particularly in the form of high attritional hardness and also high bursting strength, on the other hand, so that within the context of the present invention, overall, high-performance adsorbents based on activated carbon with specific adsorptive properties are provided.

A further subject of the present invention—according to a further aspect of the present invention—is, moreover, a production plant P according to the invention for producing the activated carbon with increased mesopore and/or macropore volume fraction, preferably with increased mesopore volume fraction, and/or for carrying out the above-described method according to the invention.

In this context, the production plant (P) according to the invention has the following apparatus:

(A) at least one sulfonation and/or reaction apparatus 1 for sulfonating a polymeric organic starting material, especially a particulate polymeric organic starting material, wherein the sulfonation apparatus 1 has at least one means for contacting the starting material with at least one sulfonating agent and/or for causing to act and reacting the sulfonating agent with the starting material, wherein the sulfonation plant 1, especially the at least one means, is configured in such a way that the durations and/or the temperatures of the causing to act and reacting of the sulfonating agent with the starting material are settable in such a way that the sulfonation takes place with simultaneous volume expansion (volume increase) of the starting material;

(B) at least one carbonization apparatus 2 for carbonizing the sulfonated starting material (sulfonate); and (C) at least one activation apparatus 3 for activating the carbonized starting material (carbonized material) especially to give the activated carbon (activated material), wherein the sulfonation apparatus 1, the carbonization apparatus 2, and the activation apparatus 3 are disposed and/or connected one after another in processing direction and/or downstream in the order specified above.

In accordance with the invention, therefore, a very specific production plant is likewise provided, which by virtue of its specific design allows the implementation of the method according to the invention, including, in particular, with regard to the specific sulfonation of the starting material with the inventively provided volume expansion of the starting material.

In this context, the sulfonation and/or reaction apparatus 1 may be configured for continuous or discontinuous operation, especially for discontinuous operation. Moreover, the sulfonation and/or reaction apparatus 1 may comprise or consist of a rotary tube, preferably a rotary tube furnace, and/or a stirring reactor.

In particular, the sulfonation and/or reaction apparatus 1 can be operable at temperatures in the range from 100° C. to 330° C., especially in the range from 200° C. to 330° C., preferably in the range from 250° C. to 330° C.

In particular, the sulfonation and/or reaction apparatus 1 may be operable and/or configured for forming and/or setting a continuous, especially linear, temperature gradient or temperature profile.

Moreover, the sulfonation and/or reaction apparatus 1 may be operable and/or configured for forming and/or setting a stagewise temperature gradient or temperature profile, especially with application and/or formation of at least one temperature plateau.

Moreover, the production plant P according to the invention may have at least one drying apparatus for drying the sulfonated starting material. In this context, the drying apparatus may be connected and/or disposed downstream of the sulfonation and/or reaction apparatus 1 or after the sulfonation and/or reaction apparatus 1 in processing direction. Moreover, the drying apparatus may also be connected and/or disposed upstream of the carbonization apparatus 2 or ahead of the carbonization apparatus 2 in the processing direction. The provision of a drying apparatus here is merely optional. In particular, the drying of the sulfonated starting material may already take place in the sulfonation and/or reaction apparatus, as described above.

Moreover, the production plant P may have at least one repository and/or accommodation apparatus 4, especially for the leaving and/or repositing of the sulfonated starting material. In this context, the repository and/or accommodation apparatus 4 may be connected and/or disposed downstream of the sulfonation and/or reaction apparatus 1 and/or of the drying apparatus 4 optionally present, and/or after the sulfonation and/or reaction apparatus 1 and the optionally present drying apparatus in the processing direction. In particular the repository and/or accommodation apparatus 4 may be connected and/or disposed upstream of the carbonization apparatus 2 or ahead of the carbonization apparatus 2 in the processing direction.

In this context, the repository and/or accommodation apparatus 4 for repositing the sulfonated starting material may be operable and/or configured at temperatures in the range from 15° C. to 30° C. and/or in ambient atmosphere (ambient air), especially air, or under an inert atmosphere, especially under a nitrogen atmosphere. In this case the apparatus may comprise containers, as for example in pot-like form or the like, which are made from an acid-resistant and/or inert material, such as plastic or suitable metal alloys.

The carbonization apparatus 2 as such may comprise or consist of at least one rotary tube, preferably a rotary tube furnace, and/or at least one belt furnace.

In particular, the carbonization apparatus 2 may form a closed system. Moreover, the carbonization apparatus 2 ought to be operable under inert conditions. In this context, the carbonization apparatus 2 ought to be operable discontinuously, continuously or quasicontinuously, especially continuously or quasicontinuously. Similarly, the temperature of the carbonization apparatus 2 ought to be able to be regulated continuously and/or stagewise. It is equally of advantage in accordance with the invention if the carbonization apparatus 2 is configured to accommodate a carbonizing atmosphere, especially an inert atmosphere.

The carbonization apparatus 2 ought, moreover, to be operable at temperatures in the range from 100° C. to 1200° C., especially in the range from 150° C. to 1100° C., preferably in the range from 200° C. to 1000° C. This allows efficient carbonization of sulfonated starting material.

Similarly, provision may be made within the present invention that the carbonization apparatus 2 is operable and/or configured for forming and/or setting a temperature gradient and/or a temperature profile. In this context, the formation of the temperature gradient and/or of the temperature profile may take place time-dependently and/or spatially in the carbonization apparatus 2, especially in the form of temperature zones.

Moreover, the temperature of the carbonization apparatus 2 in operation may be able to be regulated in such a way that there are two or more, especially two, temperature zones 2', 2" each with temperatures different from one another, preferably with a temperature of the individual temperature stages that increases in each case upstream, or else that there is a temperature gradient, preferably with a temperature profile which increases upstream.

As far, moreover, as the activation apparatus 3 provided for the production plant P according to the invention is concerned, it may equally have and/or consist of at least one rotary tube, preferably a rotary tube furnace.

With regard, moreover, to the activation apparatus 3 as such, it may be configured for accommodating at least one activating gas, especially oxygen, more particularly in the form of air, water vapor and/or carbon dioxide, or mixtures of these activating gases.

In particular, the activation apparatus 3 may be operable and/or configured at temperatures in the range from 700 to 1200° C., especially in the range from 800° C. to 1100° C., preferably in the range from 850° C. to 1000° C., very preferably in the range from 900 to 975° C.

With regard, furthermore, to the activation apparatus 3 of the production plant P of the invention, it may be operable and/or configured for forming and/or setting a temperature gradient and/or a temperature profile. The formation of the temperature gradient and/or of the temperature profile may take place in operation here time-dependently and/or spatially in the activation apparatus 3, especially in the form of temperature zones, preferably two temperature zones 3', 3".

In the context of the present invention, therefore, a production plant P is provided which, through application of the method according to the invention, enables the activated carbon of the invention to be obtained with the relevant properties.

With regard, furthermore, to the production plant P of the invention, reference may also be made to the description hereinafter of the figures, with the reference symbols given above relating to the corresponding depiction in FIG. 2.

The present invention relates—according to a further aspect of the present invention—as well to the use of the activated carbon according to the invention for the adsorption of poisons, noxiants, and odors, especially from gas or air streams, or for cleaning or purifying gases, especially air, or liquids, especially water, and/or for use in adsorption filter materials, especially for the production of protective apparel, and/or as sorption stores for gases or liquids, and/or in the sector of the food industry, especially for purifying and/or decolorizing foods, and/or in the sector of medicine or pharmacy, especially as a drug or drug constituent, and/or for producing protective apparel and/or protective articles of any kind, especially protective apparel, especially for the civil or military sector, such as protective suits, protective gloves, protective footwear, protective socks, protective headgear, and the like, and protective covers of any kind, preferably all aforesaid protective materials for NBC deployment and/or with protective function relative to radioactive noxiants and/or poisons and/or with respect to biological noxiants and/or poisons and/or with respect to chemical noxiants and/or poisons, and/or for producing filters and filter materials of any kind, especially for removing noxiant, odorous, and poisonous substances of any kind, preferably for removing radioactive noxiant and/or poisonous substances and/or biological noxiant and/or poisonous substances and/or chemical noxiant and/or poisonous substances, especially from air and/or gas streams, such as NBC protective mask filters, odor filters, sheet filters, air filters, especially filters for indoor air cleaning, adsorption-capable supporting structures, and filters for the medical sector.

In view of the specific properties of the inventively provided activated carbon, it is therefore suitable for a multiplicity of different technical applications.

The present invention further relates—according to a further aspect of the present invention—to the protective equipment and/or protective articles of any kind according to the invention, especially for the civil or military sector, especially protective apparel, such as protective suits, protective gloves, protective footwear, protective socks, protective headgear, and the like, and also protective covers, preferably all aforesaid protective equipment and/or protective articles for NBC deployment and/or with protective function with respect to radioactive noxiants and/or poisons and/or with respect to biological noxiants and/or poisons and/or with respect to chemical noxiants and/or poisons, produced using an activated carbon as defined above, and/or comprising an activated carbon as defined above.

Lastly, the present invention—according to a further aspect of the present invention—also relates to filters and filter materials of any kind, especially for removing noxiant, odorous, and poisonous substances of any kind, preferably for removing radioactive noxiant and/or poisonous substances and/or biological noxiant and/or poisonous substances and/or chemical noxiant and/or poisonous substances, especially from air and/or gas streams, such as protective mask filters, odor filters, sheet filters, air filters, especially filters for indoor air cleaning, adsorptive support structures, and filters for the medical sector, produced using an activated carbon as defined above and/or comprising an activated carbon as defined above.

The present invention is also described with reference to drawings or figures showing preferred embodiments and/or working examples, and the observations in this regard are valid for all aspects according to the invention, and the corresponding preferred embodiments are not in any way limiting.

Figure 2:
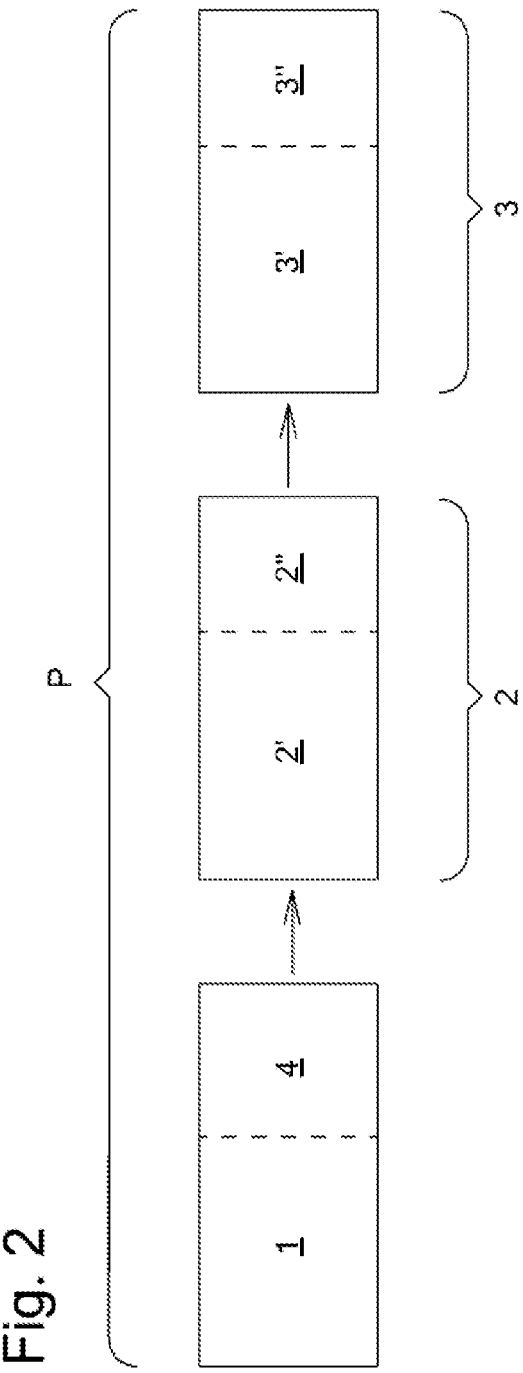
FIG. 2 shows a diagrammatic depiction of a production plant P of the invention, with a sulfonation apparatus 1 for carrying out the sulfonation of the inventively employed starting material, with the relevantly provided volume expansion or volume increase as a consequence of defined causing to act and/or reacting of the sulfonating agent with the starting material; the production plant P, moreover, has a repository and/or accommodation apparatus 4 for the storage and, respectively, the leaving and/or repositing of the sulfonated starting material, and also has a carbonization apparatus 2 with means for forming two temperature zones 2', 2''; furthermore, the production plant P, downstream of the carbonization apparatus 2, has an activation apparatus 3, which comprises means for forming two temperature zones 3' and 3''.
Figure 3:
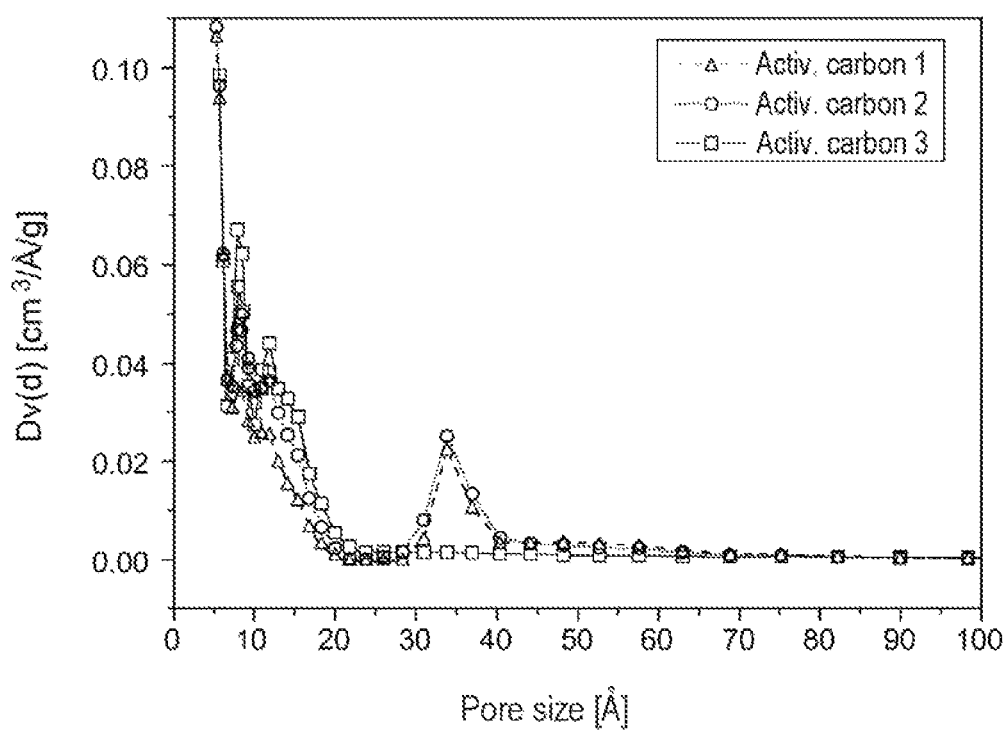
FIG. 3 shows a graphic depiction of the pore size distribution of activated carbons of the invention (activated carbons 1 and 2) and also of a corresponding comparative material (activated carbon 3); in contrast to the comparative material, the activated carbons of the invention have a high mesoporosity, with a high fraction of pores in a defined mesopore size range.

In the figures,

FIG. 1 shows a diagrammatic depiction of a method sequence of the invention, whereby in step (a) provision is made for sulfonation of a starting material, optionally with accompanying drying of the starting material, and also subsequent leaving and/or repositing of the sulfonated starting material, the starting material being subjected to defined volume expansion on the basis of the procedure of the method of the invention; subsequently, according to step (b) of the method of the invention, the sulfonated starting material obtained beforehand is carbonized, provision being made for a two-stage carbonization in this respect; next comes step (c), with the activation of the carbonized material obtained before on the basis of the sulfonated and volume-expanded starting material, the activation being based on a two-stage procedure;

FIG. 2 shows a diagrammatic depiction of a production plant P of the invention, with a sulfonation apparatus 1 for carrying out the sulfonation of the inventively employed starting material, with the relevantly provided volume expansion or volume increase as a consequence of defined causing to act and/or reacting of the sulfonating agent with the starting material; the production plant P, moreover, has a repository and/or accommodation apparatus 4 for the storage and, respectively, the leaving and/or repositing of the sulfonated starting material, and also has a carbonization apparatus 2 with means for forming two temperature zones 2', 2"; furthermore, the production plant P, downstream of the carbonization apparatus 2, has an activation apparatus 3, which comprises means for forming two temperature zones 3' and 3";

FIG. 3 shows a graphic depiction of the pore size distribution of activated carbons of the invention (activated carbons 1 and 2) and also of a corresponding comparative material (activated carbon 3); in contrast to the comparative material, the activated carbons of the invention have a high mesoporosity, with a high fraction of pores in a defined mesopore size range.

Further refinements, elaborations, variations, modifications, special features, and advantages of the present invention are readily apparent to and realizable by the skilled person on reading the description, without their having to depart the realm of the present invention.

The present invention is illustrated by the working examples which follow and which, however, are in no way intended to limit the present invention.

WORKING EXAMPLES

For the purposes of the present invention, the applicant is producing various activated carbons according to the invention, employing the method of the invention, and also comparative activated carbons, and is analyzing them for their properties:

1. To produce a first inventive activated carbon A, the starting material used is a spherical, polymeric, organic starting material of defined average particle diameter, the starting material as such having no sulfonic acid groups. The starting material employed has a high microporosity. In this context, a starting material is used which has a micropore fraction, based on the total pore volume, of more than 99%. In this context, the starting material is a material based on divinylbenzene-crosslinked polystyrene of defined divinylbenzene content.

The starting material is first subjected to a separate sulfonation, to be more precise a sulfonation carried out separately from the carbonization and/or activation. This sulfonation is carried out in a corresponding sulfonation apparatus at constant temperature of 250° C. The sulfonating agent used is a mixture of oleum on the one hand and concentrated sulfuric acid in a weight ratio (oleum:concentrated sulfuric acid) of about 2:1. The weight ratio of the sulfonating agent to the starting material (sulfonating agent-starting material), moreover, is about 2:1. The sulfonation is carried out for a period of around 5 h.

The starting material sulfonated in this way (sulfonate) is taken from the sulfonation apparatus and transferred in cooled form, but without further (interim) storage and/or repositing, into a carbonization apparatus in the form of a rotary tube furnace. The carbonization here takes place under a defined carbonizing atmosphere with a defined temperature profile of 350° C. to 920° C. for a total duration of about 5.5 h.

Subsequently, the carbonized material obtained beforehand is activated in an activation apparatus in the form of a rotary tube furnace. Operation for this purpose takes place at temperatures of about 920° C. for a duration of about 5 h under a nitrogen atmosphere, to which, moreover, water and/or water vapor is added.

The inventive activated carbon (activated material) as per material A is obtained in this way.

2. Furthermore, an inventive activated carbon B is produced on the basis of the observations above in section 1.), with the proviso that the sulfonation in method step (a) is carried out with application of a linear temperature gradient or temperature profile (i.e., constant temperature increase during the sulfonation phase). For this purpose, the temperature in the sulfonation apparatus is increased continuously from 120° C. to 250° C. over the sulfonation period. After carbonization and activation have taken place, the inventive activated carbon as per material B is obtained in this way.

3. Furthermore, an inventive activated carbon C is produced on the basis of the observations in section 2.), but with a procedure, moreover, in which, between the sulfonation in the sulfonation apparatus on the one hand and the subsequent carbonization on the other hand, a step is carried out of leaving and/or repositing the sulfonated starting material or the sulfonate. For this purpose, the sulfonated starting material is reposited at a temperature of about 20° C. for a duration of 4 weeks (ambient atmosphere). After carbonization and/or activation has taken place, accordingly, the inventive activated carbon as per material C is obtained.

4. Furthermore, an inventive activated carbon D is produced, the procedure in this respect being in accordance with the observations in section 1.), with the proviso that in the course of the sulfonation the material is heated to a temperature plateau, present at the end of the sulfonation step (hold temperature), of 250° C., with a duration of 3 h, accompanied by further drying of the sulfonated starting material (ambient atmosphere). Following corresponding carbonization and/or activation, the inventive activated carbon as per material D is obtained on this basis.

5. Furthermore, an inventive activated carbon E is produced, the procedure for this purpose being in accordance with the observations in section 4.), except that, as described in section 3.), a step of leaving and/or repositing the sulfonated starting material or the sulfonate is carried out between the sulfonation in the sulfonation apparatus, on the one hand, and the subsequent carbonization, on the other hand. In this way, following carbonization and activation, the inventive material E is obtained.

6. Furthermore, an activated carbon is produced in the form of comparative material F. For this purpose, the step of the sulfonation on the one hand and the step of the carbonization on the other hand are carried out in immediate succession, so that there is no separation of the method steps in question. The contact time with the sulfonating agent in the sulfonating step in this case is about 3 minutes. In this way, after corresponding carbonization and final activation, the comparative material F is obtained.

7. In order to produce a further activated carbon in the form of the comparative material G, the starting material used is a starting material which has already been sulfonated, i.e., a material of this kind which already possesses corresponding sulfonic acid groups, meaning that no further sulfonization is carried out. The starting material in question is subjected to carbonization and subsequent activation, as indicated in section 1.), to give comparative material G.

8. Furthermore, to obtain comparative material H, a starting material is used in accordance with the observations in section 1.), with the proviso that the starting material in this case has a high meso-/macroporosity and is therefore not a microporous starting material. In this respect, the starting material used has a mesopore and macropore content, based on the total pore volume, of at least 85%. Furthermore, for the sulfonation and also for the subsequent carbonization and activation, the procedure followed is that of section 6.).

The activated carbons recited above are investigated or analyzed for their specific materials properties. The relevant results can be seen in the table below.

|  | A (inv.) | B (inv.) | C (inv.) | D (inv.) | E (inv.) | F (comp.) | G (comp.) | H (comp.) |
| --- | --- | --- | --- | --- | --- | --- | --- | --- |
| Iodine number (ASTM D4607-94/99) [mg/g] | 1789 | 1829 | 1912 | 1873 | 1998 | 1240 | 1108 | 1010 |
| Butane adsorption (ASTM D5742-95/00) [%] | 60 | 65 | 74 | 68 | 78 | 48 | 45 | 44 |
| Methylene blue number (CEFIC) [ml] | 40 | 42 | 45 | 45 | 48 | 28 | 25 | 26 |
| Gurvich total pore volume ($p/p_0 = 0.995$) [cm$^3$/g] | 3.192 | 3.228 | 3.923 | 3.449 | 4.125 | 2.850 | 2.416 | 2.641 |
| Mesopore fraction (pore diameter 2 nm to 50 nm), based on total pore volume [%] | 55.2 | 58.7 | 62.3 | 60.9 | 68.5 | 31.4 | 15.1 | 14.6 |
| BET surface area (multipoint, MP) ($p/p0 = 0.05$-$0.1$) (ASTM D6556-04) [m$^2$/g] | 1972 | 2091 | 2380 | 2300 | 2450 | 1623 | 1507 | 1570 |
| Volume expansion of sulfonate (based on the initial material) [%] | 10 | 12 | 14 | 13 | 15 | <1 | <1 | <1 |
| Attritional hardness (modified CEFIC method) [%] | 99.9 | 99.9 | 99.9 | 99.8 | 100 | 97.1 | 95.9 | 98.1 | inv. = inventive;
comp. = comparative (noninventive)

The table illustrates that the activated carbons according to the invention, produced by the inventive method, possess a high mesopore and/or macropore volume fraction, more particularly a high mesopore volume fraction, based on the total pore volume. Furthermore, the inventive activated carbons exhibit outstanding adsorption properties, and the mechanical stability is significantly improved as well. The relevant properties can be further improved significantly by means of the sulfonation, provided optionally in the context of the method of the invention, employing temperature plateaus (hold temperatures) on the one hand and also a defined storage time or repositing (leaving to stand) between sulfonation, which is carried out in the sulfonation apparatus, and subsequent carbonization.

Overall, the experiments carried out by the applicant demonstrate the improved properties of the inventive activated carbons, or the activated carbons obtainable on the basis of the method of the invention, by comparison with the comparative activated carbons recited.

The invention claimed is:

1. A particulate activated carbon having a Gurvich total pore volume including an increased mesopore volume fraction,
   - wherein the activated carbon is granular or spherical,
   - wherein 60% to 99.5% of the Gurvich total pore volume formed by mesopores is formed by mesopores having pore diameters in the range from 2 nm to 20 nm;
   - wherein the activated carbon has an average pore diameter in the range from 3 nm to 20 nm;
   - wherein the activated carbon has a Gurvich total pore volume in the range from 0.5 cm$^3$/g to 4 cm$^3$/g;
   - wherein the activated carbon has an abrasion resistance of at least 99%, as determined according to modified CEFIC standard;
   - wherein the activated carbon has a specific BET surface area in the range from 500 m$^2$/g to 4500 m$^2$/g;
   - wherein the activated carbon has an iodine number in the range from 1400 mg/g to 2100 mg/g;
   - wherein the activated carbon has a butane adsorption in the range from 35% to 90%; and
   - wherein the activated carbon has a methylene blue value in the range from 17 ml to 65 ml;
   - wherein the activated carbon is obtained by a method, wherein the method comprises the following steps:
   - (a) sulfonating a particulate polymeric organic starting material by contacting the starting material with at least one sulfonating agent and subsequently causing to act and reacting the sulfonating agent with the starting material in such a way, namely for a duration in the range of from 0.5 h to 24 h and at temperatures in the range of from 50° C. to 330° C., that the sulfonation takes place with simultaneous volume expansion of the starting material, wherein the volume expansion of the starting material is increased by at least 2%, based on the particle size of the unsulfonated starting material; subsequently,
   - (b) carbonizing the sulfonated starting material obtained in step (a), then
   - (c) activating the carbonized starting material obtained in step (b) to give the activated carbon;
   - wherein, before step (b) is carried out, a step of leaving and/or repositing the sulfonated starting material is carried out.

2. A method for producing the particulate activated carbon of claim 1,
   - wherein the method comprises the following steps:
   - (a) sulfonating a particulate polymeric organic starting material by contacting the starting material with at least one sulfonating agent and subsequently causing to act and reacting the sulfonating agent with the starting material in such a way, namely for a duration in the range of from 0.5 h to 20 h and at temperatures in the range of from 75° C. to 330° C., that the sulfonation takes place with simultaneous volume expansion of the starting material, wherein the volume expansion of the starting material takes place in such a way that the particle size of the sulfonated starting material is increased by at least 2%, based on the particle size of the unsulfonated starting material; subsequently;
   - (b) carbonizing the sulfonated starting material obtained in step (a); then
   - (c) activating the carbonized starting material obtained in step (b) to give the activated carbon;
   - wherein, before step (b) is carried out, a step of leaving and/or repositing the sulfonated starting material is carried out.

3. The method as claimed in claim 2,
   - wherein the sulfonating agent used in step (a) is sulfur trioxide SO$_3$.

4. The method as claimed in claim 2,
   - wherein the sulfonating agent used in step (a) is sulfur trioxide SO$_3$ in the form of oleum optionally in mixture with concentrated sulfuric acid and wherein the sulfonating agent is used in liquid form.

5. The method as claimed in claim 2,
   - wherein the leaving and/or repositing of the sulfonated starting material is carried out at temperatures in the range of from 15° C. to 30° C.

6. The method as claimed in claim 2,
   - wherein, during the leaving and/or repositing of the sulfonated starting material, the starting material is provided with chemical groups, wherein the chemical groups on their thermal decomposition leads to free radicals and thus to chemical crosslinking.

7. The method as claimed in claim 2,
   - wherein the volume expansion of the starting material takes place in such a way that the particle size of the sulfonated starting material is increased by at least 1%, based on the particle size of the unsulfonated starting material.

8. The method as claimed in claim 2,
   - wherein the volume expansion of the starting material takes place in such a way that the particle size of the sulfonated starting material is increased by at least 5%, based on the particle size of the unsulfonated starting material.

9. The method as claimed in claim 2,
   - wherein the starting material is in the form of a granular or spherical starting material which is porous and/or gel-like and wherein the starting material has a micropore volume fraction, based on the total pore volume of the starting material, in the range of from 30% to 85%.

10. The method as claimed in claim 2,
    - wherein the carbonizing in step (b) is carried out in such a way that the chemical groups of the sulfonated starting material obtained after step (a) are thermally decomposed with formation of free radicals and/or crosslinking.

11. The method as claimed in claim 2,
    - wherein the activating in step (c) is carried out in the presence of at least one activating gas selected from the group consisting of oxygen, air, water vapor and carbon dioxide and mixtures of these activating gases.

12. The method as claimed in claim 2,
    - wherein the activating in step (c) is carried out in multiple stages, wherein the carbonized starting material is first subjected in a first activating step to activation in a water vapor-containing atmosphere, followed by a second activating step of activation in a carbon dioxide-containing atmosphere.

13. A protective equipment for the civil or military sector, wherein the protective equipment is selected from the group consisting of protective suits, protective gloves, protective footwear, protective socks, protective headgear, and protective covers and wherein the protective equipment provides protective function with respect to chemical, biological and radioactive noxiants and poisons, wherein the protective equipment comprises an activated carbon as defined in claim 1.

14. A particulate activated carbon having a Gurvich total pore volume including an increased mesopore volume fraction,
   wherein 60% to 99.5% of the Gurvich total pore volume is formed by mesopores having pore diameters in the range from 2 nm to 20 nm;
   wherein the activated carbon has an average pore diameter in the range from 3 nm to 20 nm;
   wherein the activated carbon has a Gurvich total pore volume in the range from 2 $cm^3/g$ to 3 $cm^3/g$;
   wherein the activated carbon has an abrasion resistance of at least 99.5%, as determined according to modified CEFIC standard; and
   wherein the activated carbon has a specific BET surface area in the range from 1200 $m^2/g$ to 2500 $m^2/g$;
   wherein the activated carbon has an iodine number in the range from 1450 mg/g to 2000 mg/g;
   wherein the activated carbon has a butane adsorption in the range from 45% to 80%; and
   wherein the activated carbon has a methylene blue value in the range from 19 ml to 50 ml.

15. A particulate activated carbon having a Gurvich total pore volume including an increased mesopore volume fraction,
   wherein 60% to 99.5% of the Gurvich total pore volume is formed by mesopores having pore diameters in the range from 2 nm to 20 nm;
   wherein the activated carbon has an average pore diameter in the range from 3 nm to 20 nm;
   wherein the activated carbon has a Gurvich total pore volume in the range from 0.5 $cm^3/g$ to 4 $cm^3/g$; and
   wherein the activated carbon has an abrasion resistance of at least 98%, as determined according to modified CEFIC standard;
   wherein the activated carbon has a specific BET surface area in the range from 500 $m^2/g$ to 4500 $m^2/g$;
   wherein the activated carbon has an iodine number in the range from 1400 mg/g to 2100 mg/g; and
   wherein the activated carbon has a butane adsorption in the range from 35% to 90%; and
   wherein the activated carbon has a methylene blue value in the range from 17 ml to 65 ml.

* * * * *